(12) United States Patent
Lee et al.

(10) Patent No.: US 11,980,310 B2
(45) Date of Patent: May 14, 2024

(54) REFRIGERATOR FOR ENTRANCE GATE

(71) Applicant: LG ELECTRONICS INC., Seoul (KR)

(72) Inventors: Seojin Lee, Seoul (KR); Wonjin Lee, Seoul (KR); Insun Yeo, Seoul (KR); Eugene Myung, Seoul (KR); Miyoung Seo, Seoul (KR); Kyukwan Choi, Seoul (KR); Minkyu Oh, Seoul (KR); Yezo Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 17/433,341

(22) PCT Filed: Feb. 13, 2020

(86) PCT No.: PCT/KR2020/002082
§ 371 (c)(1),
(2) Date: Aug. 24, 2021

(87) PCT Pub. No.: WO2020/175836
PCT Pub. Date: Sep. 3, 2020

(65) Prior Publication Data
US 2022/0039581 A1    Feb. 10, 2022

(30) Foreign Application Priority Data

Feb. 25, 2019  (KR) .......................... 10-2019-0021867
Jun. 19, 2019  (KR) .......................... 10-2019-0073169

(51) Int. Cl.
*H04N 5/44*     (2011.01)
*A47G 29/14*   (2006.01)
(Continued)

(52) U.S. Cl.
CPC ........... *A47G 29/141* (2013.01); *A47G 29/30* (2013.01); *E06B 7/32* (2013.01); *F25D 23/028* (2013.01);
(Continued)

(58) Field of Classification Search
CPC .................. A47G 29/141; A47G 29/30; A47G 2029/142; A47G 2029/147; E06B 7/32;
(Continued)

(56) References Cited

U.S. PATENT DOCUMENTS 6,484,531 B1 * 11/2002 Hambleton ............. F25D 23/10
312/286
7,712,328 B2 * 5/2010 Harris ....................... F25C 5/22
221/68

(Continued)

FOREIGN PATENT DOCUMENTS

CN        101261062 A        9/2008
CN        105625753 A        6/2016
(Continued)

*Primary Examiner* — Munear T Akki
(74) *Attorney, Agent, or Firm* — Bryan Cave Leighton Paisner LLP

(57) ABSTRACT

A controller for a refrigerator for an entrance gate according to an embodiment of the present invention is configured to: register a user authentication means through a user authentication method setting process; and to open an outer door only when user authentication has succeeded, if an article delivery command is input, thereby preventing theft of the article.

18 Claims, 21 Drawing Sheets

(51) Int. Cl.
*A47G 29/30* (2006.01)
*E06B 7/32* (2006.01)
*F25D 23/02* (2006.01)
*F25D 23/10* (2006.01)
*F25D 29/00* (2006.01)
*G06F 3/0482* (2013.01)
*G06F 3/04847* (2022.01)
*G07C 9/00* (2020.01)
*G07C 9/32* (2020.01)
*H04W 4/80* (2018.01)

(52) U.S. Cl.
CPC ........... *F25D 23/10* (2013.01); *F25D 29/008* (2013.01); *G06F 3/0482* (2013.01); *G06F 3/04847* (2013.01); *G07C 9/00182* (2013.01); *G07C 9/32* (2020.01); *H04W 4/80* (2018.02); *A47G 2029/142* (2013.01); *A47G 2029/147* (2013.01); *F25D 2400/361* (2013.01); *G07C 2009/0019* (2013.01)

(58) Field of Classification Search
CPC ...... F25D 23/028; F25D 23/10; F25D 29/008; F25D 2400/361; G06F 3/0482; G06F 3/04847; G07C 9/00182; G07C 9/32; G07C 2009/0019; H04W 4/80
See application file for complete search history.

(56) References Cited

U.S. PATENT DOCUMENTS 8,160,741 B1* 4/2012 Shoenfeld .............. A47B 96/00
221/92
2017/0213187 A1* 7/2017 Choi ...................... H04N 7/181

FOREIGN PATENT DOCUMENTS

| CN | 207936586 U | 10/2018 |
|---|---|---|
| CN | 109272668 A | 1/2019 |
| EP | 0920686 A1 | 6/1999 |
| JP | 08061838 A | 3/1996 |
| KR | 200357547 Y1 | 7/2004 |
| KR | 20110033394 A | 3/2011 |
| KR | 1020170029905 A | 3/2017 |
| WO | 2016036453 A1 | 3/2016 |

* cited by examiner

FIG. 28
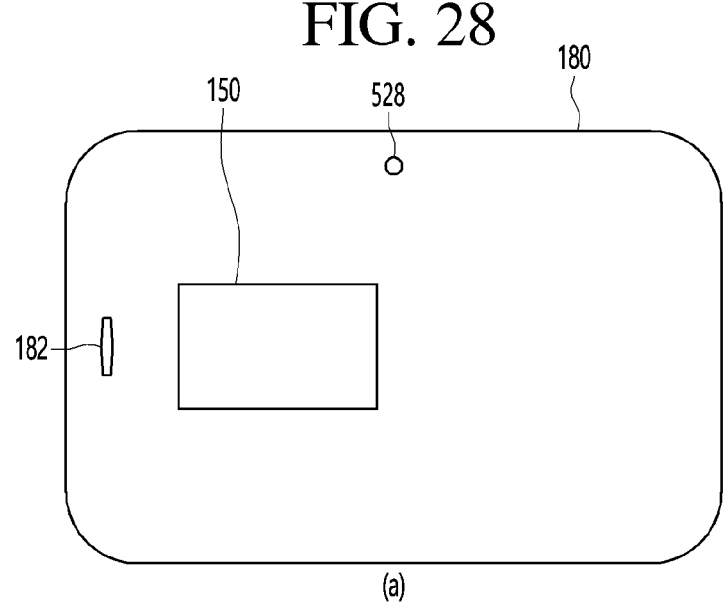
(a)
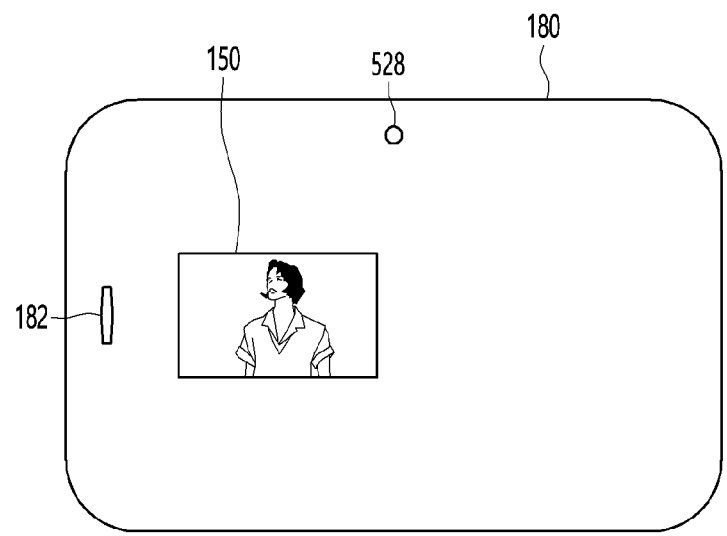
(b)

REFRIGERATOR FOR ENTRANCE GATE

This application is a National Stage Application of International Application No. PCT/KR2020/002082, filed Feb. 13, 2020, which claims the benefit of Korean Patent Application No. 10-2019-0021867, filed Feb. 25, 2019, and Korean Patent Application No. 10-2019-0073169, filed Jun. 19, 2019, the contents of which are all hereby incorporated by reference herein in their entirety.

TECHNICAL FIELD

The present invention relates to a refrigerator for an entrance gate.

BACKGROUND ART

Recently, a delivery service for delivering articles to a predetermined place has been activated. Particularly, when the article is fresh food, a refrigerator or a heating cabinet is provided in the delivery vehicle to prevent the food from being spoiling or getting cold so that the food is stored and delivered.

It is common that food is generally delivered in packaging to be maintained in a cooled or warm state. The packaging material is made of environmental pollutants such as Styrofoam, thereby creating a social atmosphere to reduce usage.

If the user is at home at the delivery time, the delivery person and the user may face-to-face to receive food, but when the user is not at home or when the delivery time is too early or too late, it is difficult for the delivery person and the user to face-to-face to receive the food.

Therefore, even if the delivery person and the user do not directly face each other, the food may be delivered, and there is a need to not spoil or cool the food until it is finally delivered to the user.

In order to solve this problem, recently, the refrigerator is installed at the entrance gate (front door) at a predetermined place, so that the delivery person keeps the food in the refrigerator to keep the food in a fresh state, and the user may access the refrigerator at a convenient time to receive the food.

In relation to a refrigerator for an entrance gate, the prior art has been disclosed as follows.

1. Patent Publication No (Publication Date): 10-2011-0033394 (Mar. 31, 2011)
2. Title of Invention: REFRIGERATOR ATTACHED TO ENTRANCE GATE AND MAIN DOOR According to the prior art document, it is described that a cooling device is provided at a lower portion of the refrigerator, but the detailed configuration of the cooling device is not disclosed at all.

In the refrigerator for the entrance gate disclosed in the prior art, it is necessary to ensure security by allowing only an authorized person to open an outer door exposed to the outside of the entrance gate.

In addition, when a malfunction of the refrigerator for the entrance gate occurs, it should be possible to immediately notify a user or a delivery person.

DISCLOSURE OF THE INVENTION

Technical Problem

The present invention is proposed to improve the problems that may occur in the conventional refrigerator for the entrance gate.

Particularly, an object of the present invention is to provide a refrigerator for an entrance gate, which is capable of keeping an article in a fresh state until a user takes out the article stored in a storage compartment of the refrigerator for the entrance gate.

In addition, an object of the present invention is to provide an refrigerator for an entrance gate, in which only the owner of the house or an authorized person opens a door of the refrigerator for the entrance gate to take out the articles stored in the refrigerator.

In addition, an object of the present invention is to provide a refrigerator for an entrance gate, which is capable of immediately transmitting a warning message to a user when an attempt to forcibly open an outer door of the refrigerator for the entrance gate without going through the authentication process, or when an external force is applied to the outer door.

Technical Solution

A refrigerator for an entrance gate according to an embodiment of the present invention for achieving the above object includes: a cabinet installed to pass through a front door or a wall, the cabinet having a storage compartment configured to store an article; an outdoor-side door connected to a front surface of the cabinet to open or close the storage compartment, the outdoor-side door being exposed to an outdoor space; an indoor-side door connected to a rear surface of the cabinet to open and close the storage compartment, the indoor-side door being exposed to an indoor space; a display portion provided on a front surface of the outdoor-side door; a cold air supply device accommodated in the cabinet, the cold air supply device being configured to supply cold air to the storage compartment, and a controller configured to control driving of the cold air supply device and the opening and closing of the indoor-side door or the outdoor-side door.

The controller may be configured to: register a user authentication means through a user authentication method setting process; and open the outdoor-side door only when the user authentication passes if an article outgoing command is input.

The controller may be configured to: detect touch of the display portion to output a setting menu screen to the display portion; detect selection of an authentication method setting menu to output a registered profile list on the display portion; perform an authentication means registration process when an authentication target profile is selected; and output a user registration completion message when the authentication means registration process is completed.

The authentication means registered in the authentication means registration process may include at least one of an NFC of a mobile device and passwords.

The controller may be configured to: perform an authentication procedure of determining whether an NFC information or passwords which is input through the display portion matches with the NFC information or passwords registered in the authentication means registration process, when the article outgoing command is input; and open the outdoor-side door only when the authentication procedure passes.

The controller may transmit, when detecting an attempt to open the outdoor-side door in a state where there is no input of the article outgoing command, a warning message to the user's mobile device together with a warning sound.

The controller may be configured to: operate a camera mounted inside the storage compartment or on the outdoor-side door to capture the inside of the storage compartment or a front side of the outdoor-side door, when detecting the attempt to open the outdoor-side door in the state where there is no input of the article outgoing command; and transmit a captured image to the user's mobile device together with the warning message.

When the article outgoing command is input, the controller may be configured to output an authentication method selection portion, which allows a user to select any one of an NFC authentication method and a password authentication method, on the display portion in a touch button shape.

When the article outgoing command is input, the controller may be configured to output an NFC authentication screen on the display portion to perform an NFC authentication process and open the outdoor-side door when the input NFC information matches with the registered NFC information.

Here, when the input NFC information does not match with the registered NFC information, or it is impossible to perform the NFC authentication procedure, the controller may be configured to output a password input screen on the display portion to perform a password authentication process.

A notification light configured to notify that the article is being stored in the storage compartment may be provided at one side of the indoor-side door.

Advantageous Effects

The refrigerator for the entrance gate according to the embodiments of the present invention may have the following effects.

First, the delivery person may safely deliver delivery articles to the orderer even when the user having the ordered article or fresh food is not at home to prevent the delivery goods from becoming lost during the delivery.

Second, in the case of the delivered article that requires the low temperature storage, such as the fresh food, there may be the advantage in that the delivered article is prevented from being damaged or deteriorated even when the orderer (or user) is absent.

Third, there may be the advantage in that only a person who delivers the article to be delivered, such as the courier opens the door of the refrigerator for the entrance gate from the outside of the entrance to prevent the theft of the delivered article from occurring.

Fourth, when the attempt to forcibly open the outer door of the refrigerator for the entrance gate or the external force or impact is applied to the outer door, the warning message may be transmitted to the user's mobile device through the wireless communication network from the controller of the refrigerator for the entrance, thereby effectively preventing the refrigerator for the entrance gate from being damaged.

Furthermore, the camera installed inside the storage compartment may automatically capture the inside of the storage compartment to transmit the captured image to the user's mobile device, and thus, the user may grasp the internal situation of the storage compartment at the remote location.

In addition, it is possible to enable the image analysis camera mounted on the outer door of the refrigerator for the entrance gate to operate to capture the face of the person attempting to open the outer door, and the captured image may be transmitted to the user's mobile device.

BRIEF DESCRIPTION OF THE DRAWINGS

FIG. 28 is a view illustrating an operation of the display portion of the refrigerator for the entrance gate according to detection results of a proximity signal detection portion.

MODE FOR CARRYING OUT THE INVENTION

Figure 1:
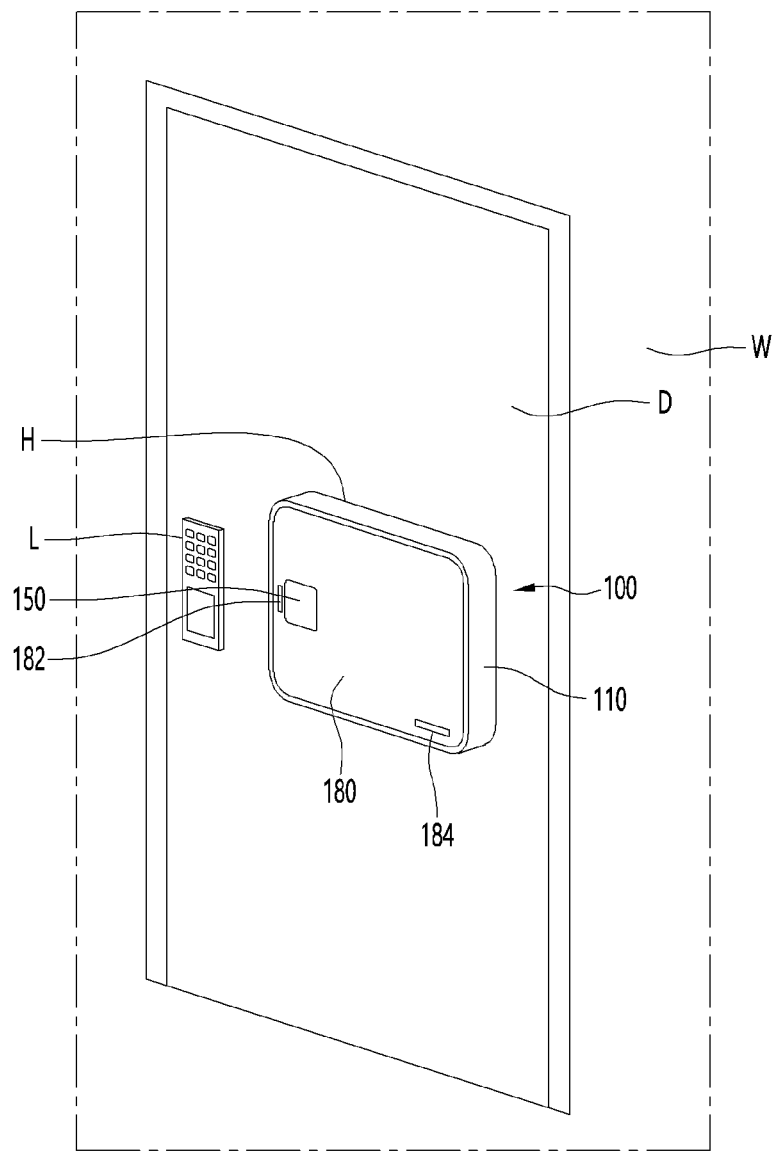
FIG. 1 is a view illustrating a state in which a refrigerator for an entrance gate is installed on a door for the entrance gate according to an embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. The terms are merely used to distinguish the corresponding component from other components, and do not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

"User" used in this specification means a consumer who purchases an article through the Internet, and should be interpreted as meaning the owner of a refrigerator for an entrance gate and his/her family.

In addition, the purchased article or ordered article should be construed to mean all other types of articles, including fresh food.

In addition, a delivery person, such as a courier driver and a postman, should be interpreted as meaning a person who has been given task and authority to deliver the article or goods ordered by the user to a storage compartment of the refrigerator for the entrance gate.

The refrigerator of the present invention may be installed to stand upright on the floor of an installation space, fixed to a door of a building, a wall of a building, or a surface of a separate support, or installed to be fixed while passing through the door, wall or support.

It is advantageous to configure a refrigeration cycle that is not heavy so as to reduce damage caused by falling from a place at which the refrigerator is installed. For example, a refrigeration cycle using a small compressor or a refrigeration cycle using a thermoelectric element module may be configured.

Since the thermoelectric element module makes less noise than the compressor, when installing the refrigerator in a space that requires low noise, such as a bedroom, a study room, a living room, a door of a building, or a wall of a building, the refrigeration cycle using the thermoelectric module is advantageous.

The thermoelectric module may be used as a refrigerator or a heating cabinet when compared to the refrigeration cycle using the compressor.

As another example, a refrigerator 100 for an entrance gate of the present invention may be used as a simple delivery box in which the thermoelectric module is not installed.

In the present invention, an input portion is provided at one side of the door or the cabinet and also is provided for inputting information. The input portion may include one or more input means or sub-input portions.

In the present invention, the display provided with the input portion may include one or more input portions.

In the present invention, the input portion and the display may be provided separately from each other.

An electronic controller (processor) of the present invention may control at least a portion of the input portion to be in an input activated state when a predetermined condition is satisfied, and to switch at least a portion of the input portion to an input inactive state when another predetermined condition is satisfied.

The controller may control the input portion to be in at least one state of i) all input activation, ii) partial input activation, or iii) all input inactivation.

Here, the input activation state is defined as a state in which information related to the operation of the refrigerator is capable of being input through the input portion, and the input deactivation state is defined as a state in which the information is not capable of being input.

The refrigerator of the present invention may include a cabinet forming a storage compartment, a door for opening or closing the storage compartment, an input portion for inputting information related to the operation of the refrigerator, and a controller.

Also, "the information related to the operation of the refrigerator" is defined as information input through the input portion of the refrigerator. For example, the information includes a command to increase or decrease in notch temperature of the refrigerator, a command to apply or cut off a voltage to an electric element or component of the refrigerator, or a command to increase or decrease in voltage, sensing information detected by a sensor installed in the refrigerator, etc.

The input portion means a means for inputting information related to an operation of the refrigerator, which includes at least one of a button through which a command related to the operation of the refrigerator are input, a product information recognizer capable of recognizing unique information about a product, such as a code scanner including a barcode reader that recognizes a barcode of the product and a QR code reader that recognizes a QR code of the product, a communication module or element (e.g., remote controller signal receiver, NFC signal receiver, etc.) that receives a signal from an external device such as a remote controller including a remote controller or a mobile terminal including a mobile phone, an image capturing portion including a camera for recognizing an image of an object including a person, a microphone that recognizes a sound signal including human voice, a motion signal detection portion that is capable of detecting a person's motion, a proximity signal detection portion (or distance signal detection portion) that is capable of detecting the proximity of a person, a touch input portion that is capable of detecting a human touch action, a biometric information detection portion that recognizes biometric information such as human vein information, iris information, or DNA information, a vibration signal detection portion that detects a user knocking on a door of the refrigerator (e.g., a knock signal detection portion), or a timer that measures an elapsing time.

The refrigerator is provided with a door, and the door may be configured to simultaneously perform functions of a first door (hereinafter, referred to as an "incoming door") that opens or closes a storage compartment for incoming of an article into the refrigerator, and a second door (hereinafter, referred to as an "outgoing door") that opens or closes the storage compartment for outgoing of the article from the refrigerator.

The refrigerator may include a plurality of doors, and the plurality of doors may be configured to include at least the incoming door and the outgoing door. For example, the incoming door may be provided at a front side of the refrigerator, and the outgoing door may be provided at a rear side of the refrigerator.

As another example, both the incoming door and the outgoing door may be provided at the front side or the rear side of the refrigerator.

In this case, it may be understood to mean that both the incoming door and a separate outgoing door that is distinguished from the incoming door are provided at the front side of the refrigerator, and both the incoming door and a separate outgoing door that is distinguished from the incoming door are provided at the rear side of the refrigerator.

The refrigerator includes an input portion, and the input portion may be configured to simultaneously perform function of a first input portion (hereinafter, referred to as an "incoming input portion") for inputting information for incoming of an article into the refrigerator, and a second input portion for inputting information for outgoing of an article (hereinafter, referred to as an "outgoing input portion").

The refrigerator may include a plurality of input portions, and the plurality of input portions may be configured to include at least the input portion for incoming and the input portion for outgoing.

According to the present invention, since a person (e.g., a delivery person) other than the user may put an article in the user's refrigerator, after an article incoming person (delivery person) performs incoming authentication to put the article into the refrigerator, a situation in which the incoming article is taken out by the article incoming person by performing the incoming authentication again may be prevented. Embodiments for solving this problems will be described below.

When the information inputted through the input portion matches set "incoming reference information (=incoming authentication information)", the refrigerator controller performs the incoming authentication in which lock of the door is released, and after the door is unlocked, the "incoming reference information" may be controlled to any one of deletion, initialization, or resetting.

On the other hand, the refrigerator controller may control the refrigerator so that the incoming authentication in which information for incoming is input through the input portion and outgoing authentication in which information for outgoing is inputted through the input portion are performed, and the incoming authentication and the outgoing authentication may be controlled to be performed in different methods. An embodiment of differently controlling the incoming authentication method and the outgoing authentication method includes the following three methods.

First, when the information input by the refrigerator controller for incoming through the input portion matches the set "incoming reference information" (e.g., information related to the article being put), the incoming authentication in which the lock of the door is released may be controlled to be performed, and when the information input for outgoing through the input portion matches the "outgoing reference information set differently from the incoming reference information" (e.g., user information registered in relation to the refrigerator), the outgoing authentication that unlocks the door may be controlled to be performed.

Second, the refrigerator has a plurality of input portions, and an incoming input portion (e.g., an article information recognizer such as a barcode reader or a QR code reader) and an outgoing input portion (e.g., a communication element that receives a signal from an external device such as an NFC signal recognizer) may be provided to be distinguished from each other.

Third, the refrigerator includes an incoming mode (e.g., a storage button) in which information for incoming can be input through the input portion and an incoming mode (e.g., a pickup button) in which information for incoming is capable of being input through the input portion, and when a predetermined condition is satisfied, the controller may control the refrigerator so that only the outgoing mode is activated.

The refrigerator controller may control a method of activating the incoming input portion and a method of activating the outgoing input portion to be different from each other.

For example, when the controller determines that the storage compartment is empty, the incoming input portion may be activated. In addition, when it is determined that the article exists in the storage compartment above a preset reference value, the outgoing input portion may be controlled to be activated.

The presence or absence of the article or an amount of article in the refrigerator may be determined through a camera in the refrigerator. Alternatively, after the incoming authentication is performed, and the door lock is released, it is possible to control the refrigerator so that only the outgoing mode is activated.

When the outgoing mode is selected, the controller may control the refrigerator so that only a pre-registered refrigerator user may perform the outgoing authentication. For example, the controller may guide the user to input a preset password in order to proceed with the outgoing authentication.

The present invention may include at least one of the embodiments described above.

In the present invention, the "incoming mode" or "storage mode" may be defined as a control mode that guides the article incoming person so that the article is stored in the storage compartment, and the "outgoing mode" or "pickup mode" may be defined as a control mode that guides the article outgoing person so that the article is stored in the storage compartment.

Figure 2:
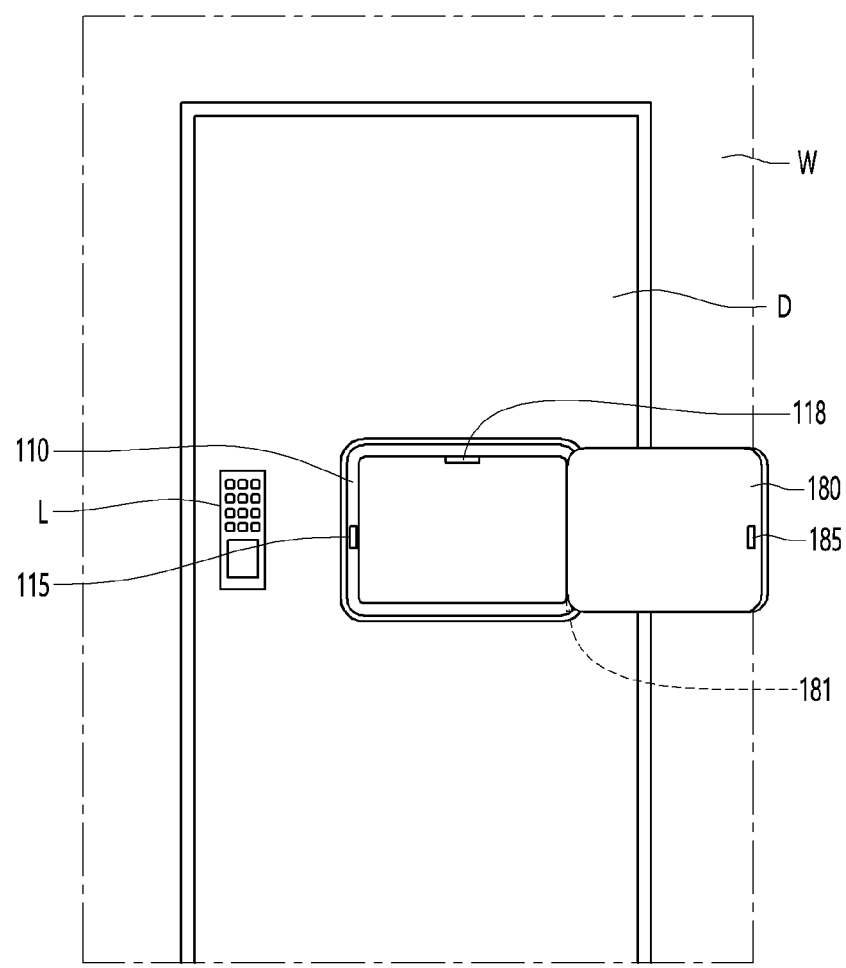
FIG. 2 is a view illustrating a state in which an outer door is opened in the state in which the refrigerator for the entrance gate is installed on the door for the entrance gate.
Figure 3:
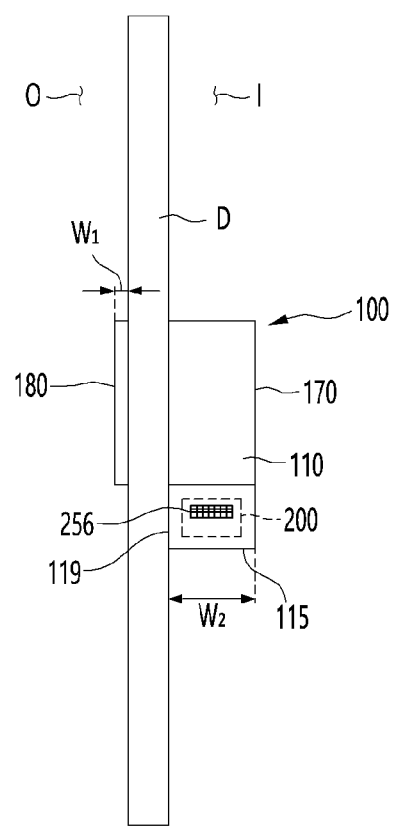
FIG. 3 is a schematic view illustrating configurations of an indoor-side and an outdoor-side based on the door in the state in which the refrigerator for the entrance gate is installed on the door for the entrance gate.

FIG. 1 is a view illustrating a state in which a refrigerator for an entrance gate is installed on a door for the entrance gate according to an embodiment of the present invention, FIG. 2 is a view illustrating a state in which an outer door is opened in the state in which the refrigerator for the entrance gate is installed on the door for the entrance gate, and FIG. 3 is a schematic view illustrating configurations of an indoor-side and an outdoor-side based on the door in the state in which the refrigerator for the entrance gate is installed on the door for the entrance gate.

Referring to FIGS. 1 to 3, an refrigerator 100 for the entrance gate according to an embodiment of the present invention may be installed on a door D for the entrance gate of a home or office. The door D for the entrance gate is installed on a wall W. A door lock L for opening the door D may be provided.

An opening H is formed in the door D for the entrance gate, and the refrigerator 100 for the entrance gate may be inserted into the opening H to extend to an indoor-side I and an outdoor-side O. The direction will be defined. With respect to the refrigerator 100 for the entrance gate, the outdoor-side O is defined as a "front side" and the indoor-side I is defined as a "rear side".

The refrigerator 100 for the entrance gate includes a cabinet 110 that forms an outer appearance thereof.

For example, the cabinet 110 may have a substantially rectangular parallelepiped shape and be disposed to pass through the opening H. A sealer 160 (see FIG. 6) is provided between the opening H and an outer surface of the cabinet 110 so that the cabinet 110 is in close contact with the opening H.

A storage compartment 110a capable of storing food is formed inside the cabinet 110. A camera 118 may be provided in the storage compartment 110a. For example, the camera 118 may be disposed above the storage compartment 110a. The camera 118 may photograph the food stored in the storage compartment 110a and upload the captured image to a delivery application.

For this, the refrigerator for the entrance gate may be provided with a communication module capable of communicating with the outside. For example, the communication module may include a Wi-Fi module.

The storage compartment 110a may be opened at the indoor-side I and the outdoor-side O.

In detail, the refrigerator 100 for the entrance gate may be provided at one side (outside) of the storage compartment 110a and may further include an outdoor-side door 180 capable of opening or closing the storage compartment 110a. The outdoor-side door 180 may be disposed at the outdoor-side O and may be, for example, a door opened by a food delivery person in order to put the food therein. The outdoor-side door 180 may be in a normally locked state to prevent an opening of any door.

The refrigerator 100 for the entrance gate may be provided at the other side (indoor-side) of the storage compartment 110a and further include an indoor-side door 170 capable of opening or closing the storage compartment 110a. The indoor-side door 170 may be disposed at the indoor-side (I) and may be a door opened by a user in order to collect food.

The outdoor-side door 180 and the indoor-side door 170 may be rotatably coupled to the cabinet 110.

The outdoor-side door 180 includes a hinge 181 coupled to the cabinet 110 and a latch 185 hooked on the cabinet 110. The hinge 181 may be provided at one side of both left and right sides of the outdoor-side door 180, and the latch 185 may be provided on the other side. The latch 185 may be provided on a rear surface of the outdoor-side door 180.

The cabinet 110 may further include a latch coupling portion 115 hooked with the latch 185.

A pressing portion 182 capable of being pressed to open the outdoor-side door 180 is provided on a front surface of the outdoor-side door 180. The pressing portion 182 is disposed in front of the latch 185 to transmit pressing force to the latch 185, and the latch 185 is released from the hook with the latch coupling portion 115 by the transferred the pressing force (push-up button manner).

Since the configuration of the indoor-side door 170 is similar to that of the outdoor-side door 180, a hinge, a latch, and a pressing portion may also be provided in the indoor-side door 170.

A code scanner 184 capable of reading information on delivered food may be provided on a front surface of the outdoor-side door 180. The code scanner 184 may include a barcode scanner or a QR code scanner.

When a food delivery person brings food information (code information) provided on food or a food container to the code scanner 184, the refrigerator 100 for the entrance gate recognizes that the food is scheduled to be delivered and release the locked state of the outdoor-side door 180. In this state, the delivery person may open the outdoor-side door 180 to store the food.

A display portion 150 may be provided on the outdoor-side door 180. Information that is necessary for use of the refrigerator 100 for the entrance gate is displayed on the display portion 150.

For example, the display portion 150 may display a "guide comment" for the delivery person. For example, the guide comment may include a comment such as "Please recognize barcode or QR code of food to code scanner".

An input portion for inputting a password or an authentication number may be displayed on the display portion 150. The delivery person may release the lock state of the outdoor-side door 180 by inputting the password promised in advance with the user into the input portion.

In summary, the delivery person allows the food code to be recognized to the code scanner 184 or inputs a password or authentication number to unlock the outdoor-side door 180, and thus, after opening the outdoor-side door 180, the food is stored in the storage compartment 110a.

The cabinet 110 may extend toward the indoor-side I and the outdoor-side O through the door D. A front-rear width W2 of a portion of the cabinet 110, which extends toward the indoor-side I, may be greater than a front-rear width W1 of a portion, which extends toward the outdoor-side O.

According to such a configuration, since an area protruding from the door D toward the indoor-side I is large, and an area protruding from the door D toward the outdoor-side O is small, an area of the refrigerator 100 for the entrance gate, which is exposed to a space through which arbitrary people pass, may be reduced. Thus, possibility of damage to the refrigerator 100 for the entrance gate may be reduced.

A front support portion 119 supported on an outer surface of the door D is formed on a lower portion of the cabinet 110 extending toward the indoor-side I. For example, the front support portion 119 may be attached to a rear surface of the door D.

A cold air supply device 200 may be provided at the lower portion of the refrigerator 100 for the entrance gate. Since a front surface portion of a portion in which the relatively heavy cold air supply device 200 is accommodated, that is, the front support portion 119 is supported or attached to the door D, the refrigerator 100 for the entrance gate may be stably mounted on the door D.

Figure 4:
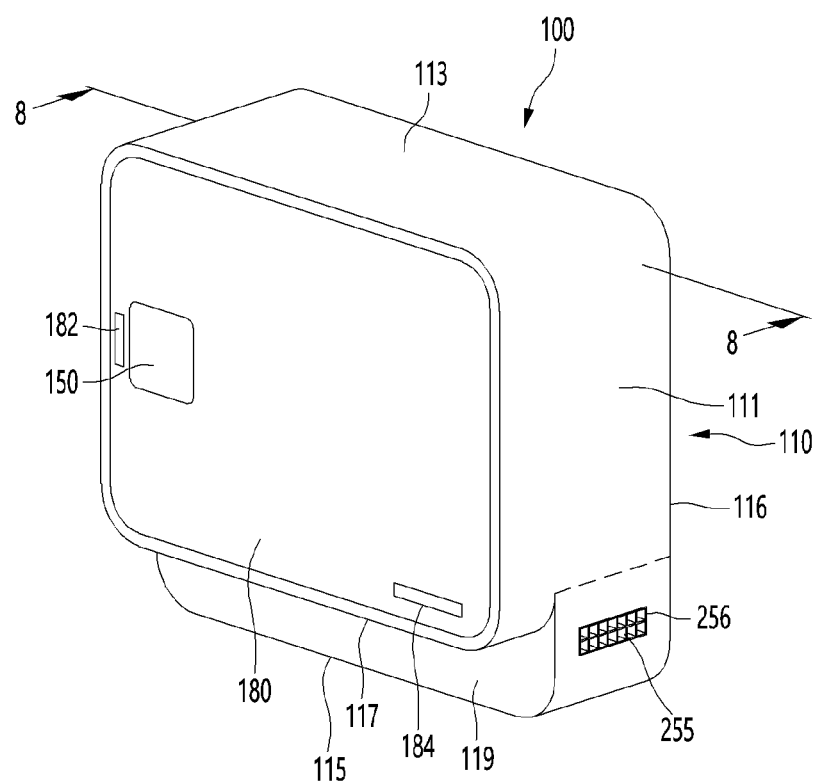
FIG. 4 is a front perspective view illustrating a configuration of the refrigerator for the entrance gate according to an embodiment of the present invention.
Figure 5:
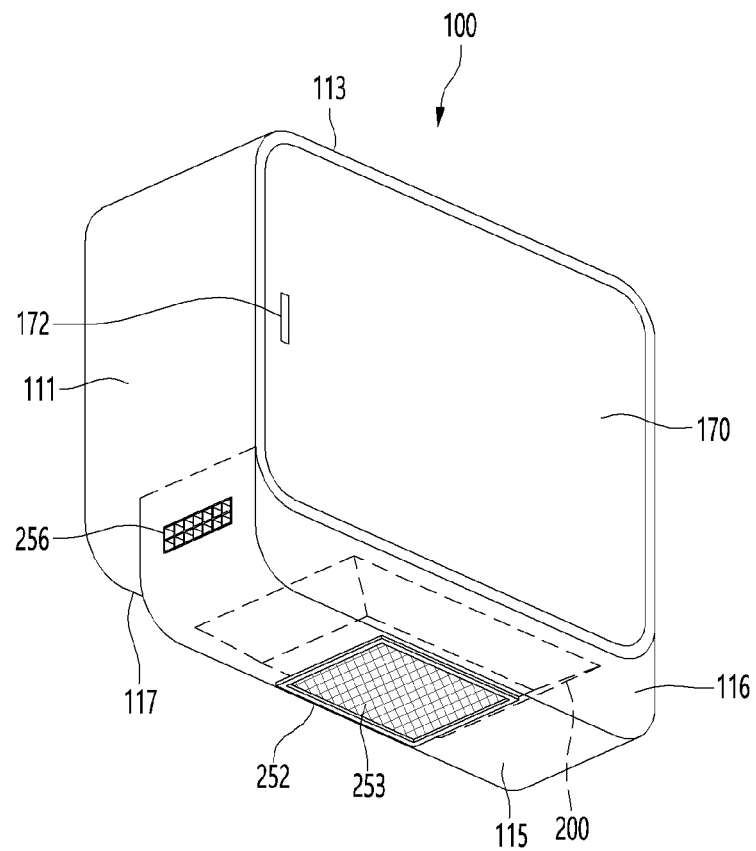
FIG. 5 is a rear perspective view illustrating a configuration of the refrigerator for the entrance gate according to an embodiment of the present invention.
Figure 6:
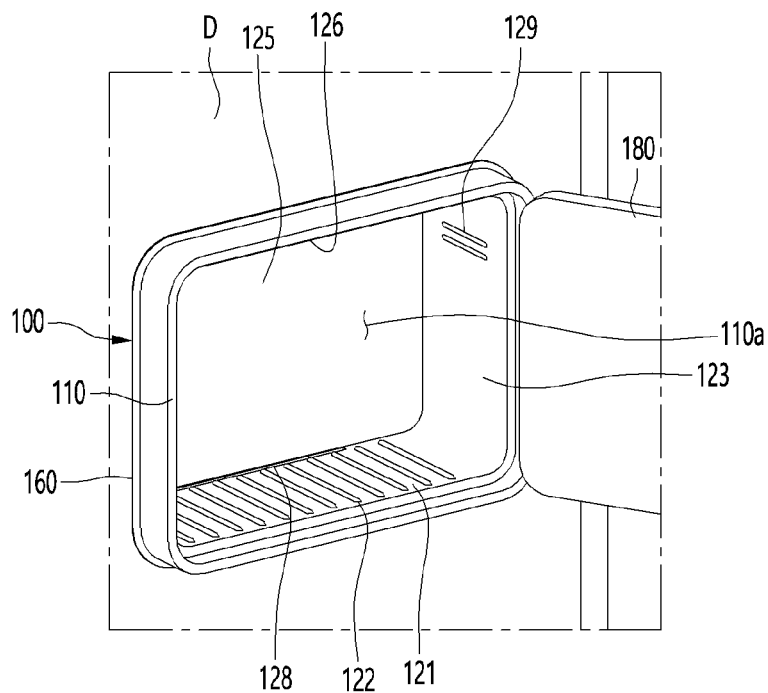
FIG. 6 is a view illustrating a shape of an inner storage compartment of the refrigerator for the entrance gate according to an embodiment of the present invention.

FIG. 4 is a front perspective view illustrating a configuration of the refrigerator for the entrance gate according to an embodiment of the present invention, FIG. 5 is a rear perspective view illustrating a configuration of the refrigerator for the entrance gate according to an embodiment of the present invention, and FIG. 6 is a view illustrating a shape of an inner storage compartment of the refrigerator for the entrance gate according to an embodiment of the present invention.

Referring to FIGS. 4 to 6, the refrigerator 100 for the entrance gate according to an embodiment of the present invention includes a cabinet 110 forming an outer appearance thereof. The cabinet 110 includes two cabinet side surface portions 111, a cabinet top surface portion 113 connecting upper portions of the two cabinet side surface portions 111 to each other, and a cabinet bottom surface portion 115 forming a bottom surface of the cabinet 110, and a cabinet rear surface portion 116.

The cabinet 110 further includes a front support portion 119 extending upward from a front end of the cabinet bottom surface portion 115 to be supported or attached to the rear surface of the door D. A cold air supply device 200 may be disposed at a rear side of the front surface support portion 119.

The cabinet 110 further includes a storage compartment bottom surface portion 117 extending forward from an upper end of the front surface support portion 119 to form a bottom surface of the storage compartment 110a.

According to the configuration of the cabinet 110, the cabinet 110 may be configured to have an "L" shape. In detail, In detail, the cabinet 110 may be understood to include a first case forming a storage compartment having a hexahedral shape and a second case which extends downward from a rear side of the first case and on which the cold air supply device 200 is installed. The first and second cases may be integrated with each other.

A dissipated heat discharge portion 255 through which external air passing through the heat dissipation portion of the cold air supply device 200 is discharged is formed at a lower portion of the cabinet side surface portion 111. A discharge grille 256 may be coupled to the dissipated heat discharge portion 255.

Doors 170 and 180 may be coupled to both sides of the cabinet 110, respectively. An opening is formed at each of both ends of the cabinet 110, and the doors 170 and 180 may be coupled to the openings, respectively.

The doors 170 and 180 include an outdoor-side door 180 provided on an outdoor-side end of the cabinet 110 and an indoor-side door 170 provided on an indoor-side end of the cabinet 110. The outdoor-side door 180 may be a door that is openable by a delivery person. After inputting a password or recognizing an article, the delivery person may open the outdoor-side door 180 to put food into the storage compartment 110a.

The user may open the indoor-side door 170 to take out the food stored in the storage compartment 110a. The structure of the indoor-side door 170 is similar to that of the outdoor-side door 180. The indoor-side door 170 may be provided with a pressing portion 172 this is capable of being manipulated to open the door. The user may open the indoor-side door 170 by pressing the pressing portion 172. However, the indoor-side door 170 is a door disposed at the indoor-side and does not require locking because only a user is accessible. Thus, there may be no need for an action (password input, product recognition, etc.) to release the locking to open the outdoor-side door 180.

A cold air supply device 200 may be provided at the lower portion of the cabinet 100. The cold air supply device 200 may be installed in a space defined by both lower sides of the cabinet side surface portion 111, the cabinet bottom surface portion 115, the front surface support portion 119, and the cabinet rear surface portion 116.

An external air inflow portion 252 for allowing external air to flow into the cold air supplying device 200 is formed in the cabinet bottom surface portion 115. The air suctioned in through the external air inflow portion 252 may be discharged through the dissipated heat discharge portion 255 via a heat dissipation fan 280 and a heat sink 220 of the cold air supply device 200. An inflow grille 253 may be installed in the external air inflow portion 252. It may be understood that the external air inflow portion 252 and the dissipated heat discharge portion 255 are formed in an outer wall of the cabinet 110.

The storage compartment 110a may be defined by an inner wall of the cabinet 110. In detail, the inner wall of the cabinet 110 includes a storage compartment lower wall 121 forming a seating surface on which food is placed, a storage compartment sidewall 123 extending upward from both sides of the storage compartment lower wall 121, a storage compartment upper wall 126 forming a top surface of the storage compartment 110a and connecting an upper portion of the storage compartment sidewall 123, and a storage compartment rear wall 125 connecting a rear portion of the storage compartment sidewall 123.

The storage compartment 110a may be configured to form a substantially hexahedral space by the storage compartment lower wall 121, the storage compartment sidewall 123, the storage compartment upper wall 126, and the storage compartment rear wall 125. The storage compartment sidewall 123 forms one surface of a second passage duct 105 (see FIG. 8).

The storage compartment lower wall 121 may be provided with a rib 122 protruding upward, and the rib 122 may extend forward and backward and be provided in plurality, which are arranged in left and right directions. Food is placed at an upper side of the plurality of ribs 122 to prevent the food from being slid.

A cold air inflow hole 128 for allowing the cold air inside the storage compartment 110a to return to the cold air supply device 200 is formed in the storage compartment lower wall 121. For example, the cold air inflow hole 128 may be formed at a rear side of the storage compartment lower wall 121.

A cold air discharge hole 129 for supplying the cold air generated by the cold air supply device 200 to a side of the storage compartment 110a is formed in the storage compartment sidewall 123. The cold air generated in the cold air supply device 200 may be supplied to the side surface portion of the storage compartment 110a by the configurations of the cold air inflow hole 128 and the cold air discharge hole 129, and then be returned to the cold air supply device 200 through a rear lower portion.

A camera 118 capable of photographing food put into the storage compartment 110a may be installed on the upper wall 126 of the storage compartment 110a.

Figure 7:
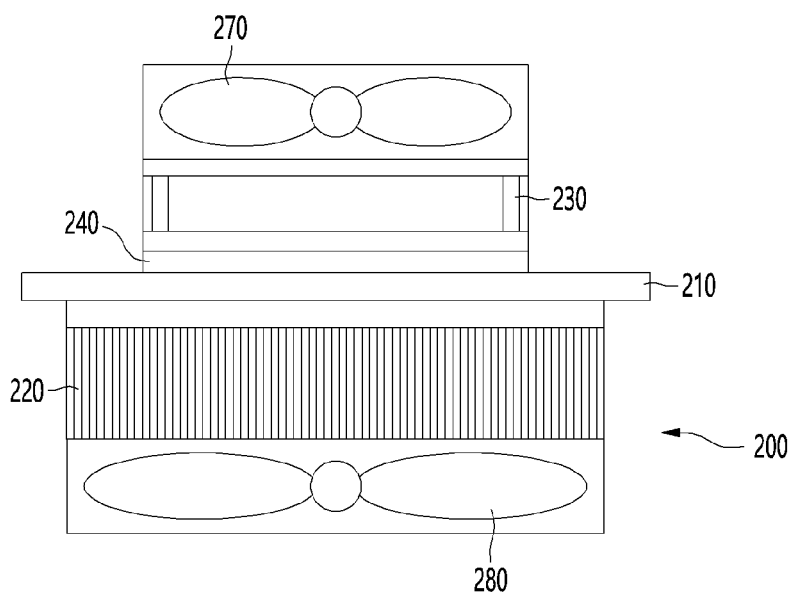
FIG. 7 is a view illustrating a configuration of a cold air supply device according to an embodiment of the present invention.
Figure 8:
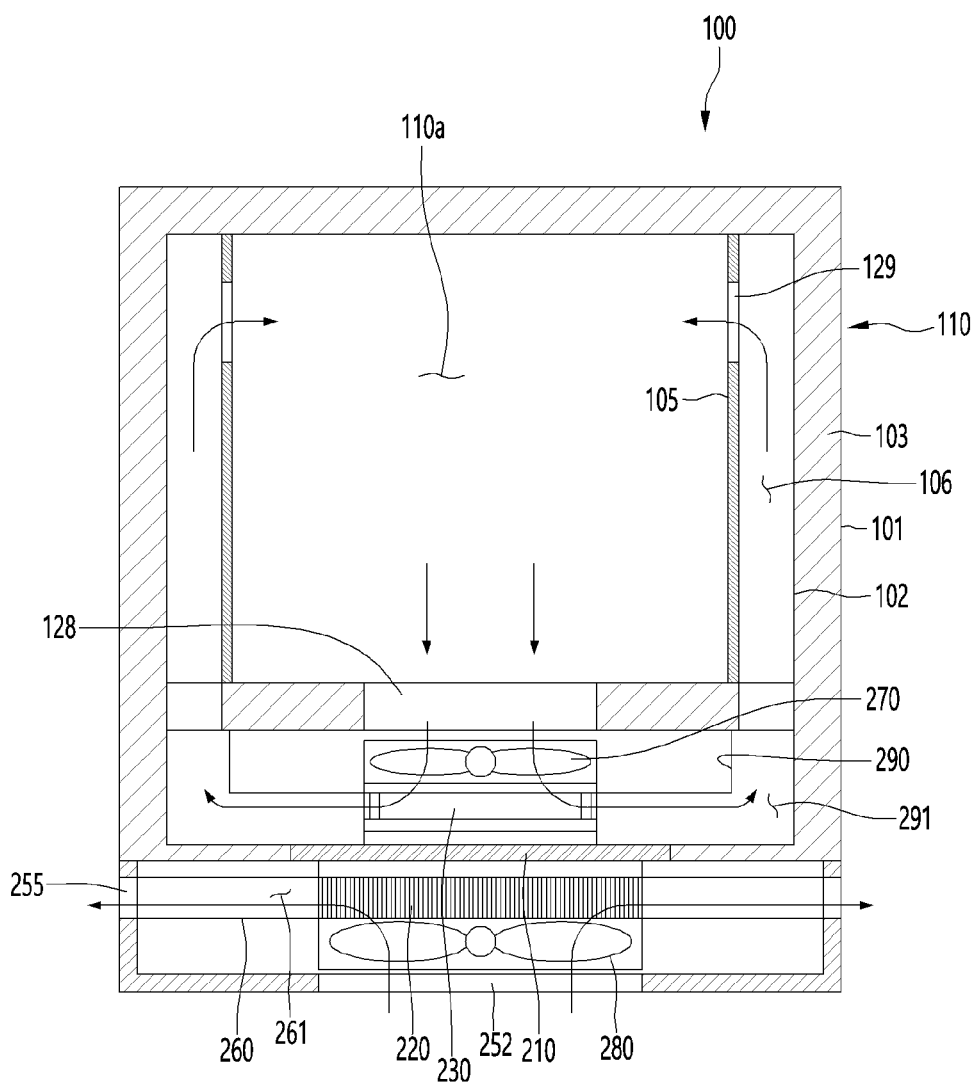
FIG. 8 is a cross-sectional view taken along line 8-8 of FIG. 4.
Figure 9:
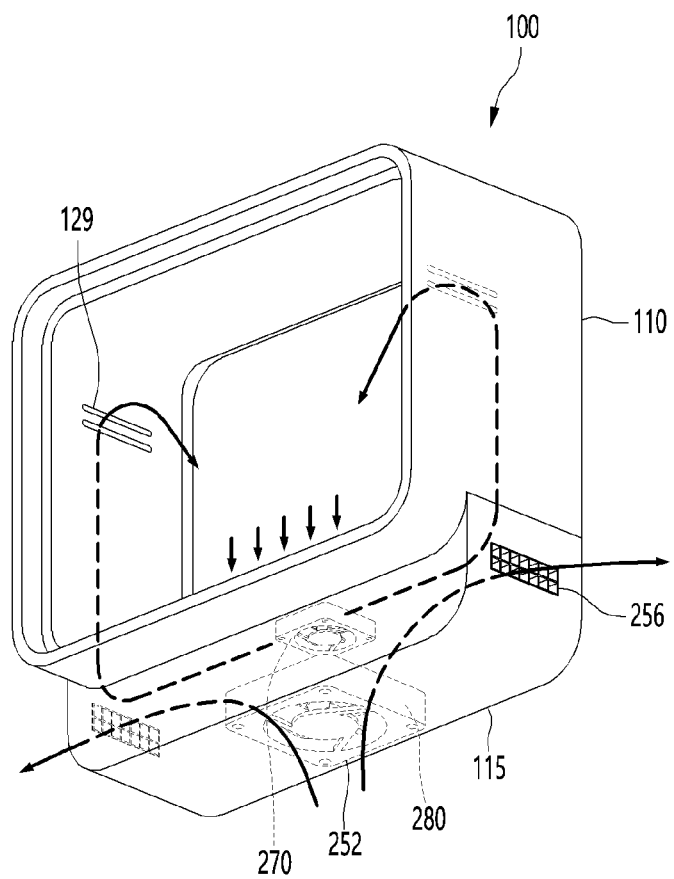
FIG. 9 is a view illustrating a state in which cold air supply and heat dissipation are performed in the refrigerator for the entrance gate according to an embodiment of the present invention.

FIG. 7 is a view illustrating a configuration of the cold air supply device according to an embodiment of the present invention, FIG. 8 is a cross-sectional view taken along line 8-8 of FIG. 4, and FIG. 9 is a view illustrating a state in which cold air supply and heat dissipation are performed in the refrigerator for the entrance gate according to an embodiment of the present invention.

Referring to FIGS. 7 to 9, the cold air supply device 200 according to the embodiment of the present invention is installed at the lower portion of the cabinet 100 and is provided at a lower portion of the storage compartment 110a to form a cold air passage and a heat dissipation passage.

The cold air supply device may include a thermoelectric module for generating cold air. Since the refrigerator 100 for the entrance gate is not provided with a component for driving a refrigeration cycle, for example, a high noise generation source such as a compressor, and thus, noise generation during the operation of the refrigerator 100 may be reduced.

Since the thermoelectric module is configured to be relatively lightweight, it is possible to reduce a weight of the refrigerator 100 for the entrance gate, which needs to be stably installed on the door D for the entrance gate.

The thermoelectric module 200 includes a thermoelectric element, and the thermoelectric element refers to an element that implements cooling and heat generation using a Peltier effect. When a heat absorption-side of the thermoelectric element is disposed to face the storage compartment 110a, and a heat generation-side of the thermoelectric element is disposed to face the lower portion of the refrigerator 100, the storage compartment 110a may be cooled through an operation of the thermoelectric element.

In detail, the thermoelectric module 200 includes a module body 210 to which the thermoelectric element is coupled and which has a rectangular plate shape, a cold sink 230 provided at one side of the module body 210 to be heat-exchanged with the cold air of the storage compartment 110a, and a heat sink 220 provided at the other side of the module body 210 to be heat-exchanged with external air.

The one side of the module body 210 is a direction toward the storage compartment 110, that is, an upper side with respect to the thermoelectric module 200, and the other side is a direction toward the outside of the refrigerator 100, that is, a lower side.

The cold sink 230 is disposed to be in contact with the heat absorption portion of the thermoelectric element, and the heat sink 220 is disposed to be in contact with the heat generation portion of the thermoelectric element. The heat absorption portion and the heat generation portion of the thermoelectric element may have shapes that are in surface contact with each other to form opposite surfaces.

In the thermoelectric module 200, heat has to be rapidly dissipated from the heat generation portion of the thermoelectric element, so that the heat is sufficiently absorbed into the heat absorption portion of the thermoelectric element. Thus, a heat exchange area of the heat sink 220 may be larger than a heat exchange area of the cold sink 230.

Each of the heat sink 220 and the cold sink 230 may include a base that is in contact with the thermoelectric element and a heat transfer fin coupled to the base.

The thermoelectric module 200 further includes a module insulator 240 installed between the cold sink 230 and the heat sink 220. For example, the module insulator 240 may have a quadrangular frame shape and may be disposed to surround an edge of the thermoelectric element.

A cold air circulation fan 270 may be installed at an upper side of the thermoelectric module 200 to face the storage compartment 110a so as to forcibly circulate the cold air in the storage compartment 110a. The cold air circulation fan 270 may be disposed above the cold sink 230. For example, the heat circulation fan 270 may include a centrifugal fan that suctions the cold air in the axial direction and discharges the cold air in the radial direction.

The cabinet 110 includes an outer case 101 that forms an outer appearance of the refrigerator 100, an inner case 101 that is inserted into the outer case 101 to form at least a portion of the inner wall of the storage compartment, and an insulator 103 provided between the outer case 101 and the inner case 101.

A first passage duct 290 extending from the cold sink 230 to guide a flow of the cold air is provided inside the cabinet 110.

The first passage duct 290 may be configured to extend laterally from both sides of the cold sink 230 and then extend upward. A first cold air passage 291 may be formed inside the first passage duct 290. The first passage duct 290 may be connected to a second passage duct 105.

The second passage duct 105 is provided on each of both sides of the inner case 101. The second passage duct 105 forms the storage compartment sidewall 123, and the cold air discharge hole 129 is formed at an upper portion of the second passage duct 105.

A second cold air passage 106 through which the cold air flows is formed between each of both side surfaces of the inner case 101 and the second passage duct 105. The second cold air passage 106 may extend upward from the first cold air passage 291.

When the cold air circulation fan 270 is driven, the cold air in the storage compartment 110a flows in the axial direction of the cold air circulation fan 270 through the cold air inflow hole 128, and then is heat-exchanged with the cold sink 230 so as to be cooled. The cooled cold air flows to both sides in the radial direction of the cold air circulation fan 270 and is introduced into the first cold air passage 291.

The cold air of the first cold air passage 291 may flow upward to flow into the second cold air passage 106 and then be discharged to both the sides of the storage compartment 110a through the cold air discharge hole 129.

The refrigerator 100 further includes a heat dissipation fan 280 that introduces external air to be heat-exchanged with the heat dissipation portion of the thermoelectric element. The heat dissipation fan 280 is supported on the cabinet bottom surface portion 115 and be disposed above the external air inflow portion 252. For example, the heat dissipation fan 280 may include a centrifugal fan that suctions the cold air in the axial direction and discharges the cold air in the radial direction.

A heat dissipation passage duct 260 extending from the heat sink 220 to guide a flow of external air and forming a heat dissipation passage 261 therein is provided in the cabinet 110. The heat dissipation passage duct 260 may extend laterally from both sides of the heat sink 220 and be connected to the dissipated heat discharge portion 255.

When the heat dissipation fan 278 is driven, the external air is introduced in the axial direction of the heat dissipation fan 280 through the external air inflow portion 252 and then is heat-exchanged with the heat sink 220 so as to be heated. The heated cool air may flow to both sides in the radial direction of the heat dissipation fan 270 and may be discharged from the dissipated heat discharge portion 255 to the outside of the refrigerator through the heat dissipation passage duct 260.

As power to be supplied to the refrigerator 100 for the entrance gate, power to be supplied to an intercom or a doorbell installed around the door D, or an indoor-side lighting source may be used.

Figure 10:
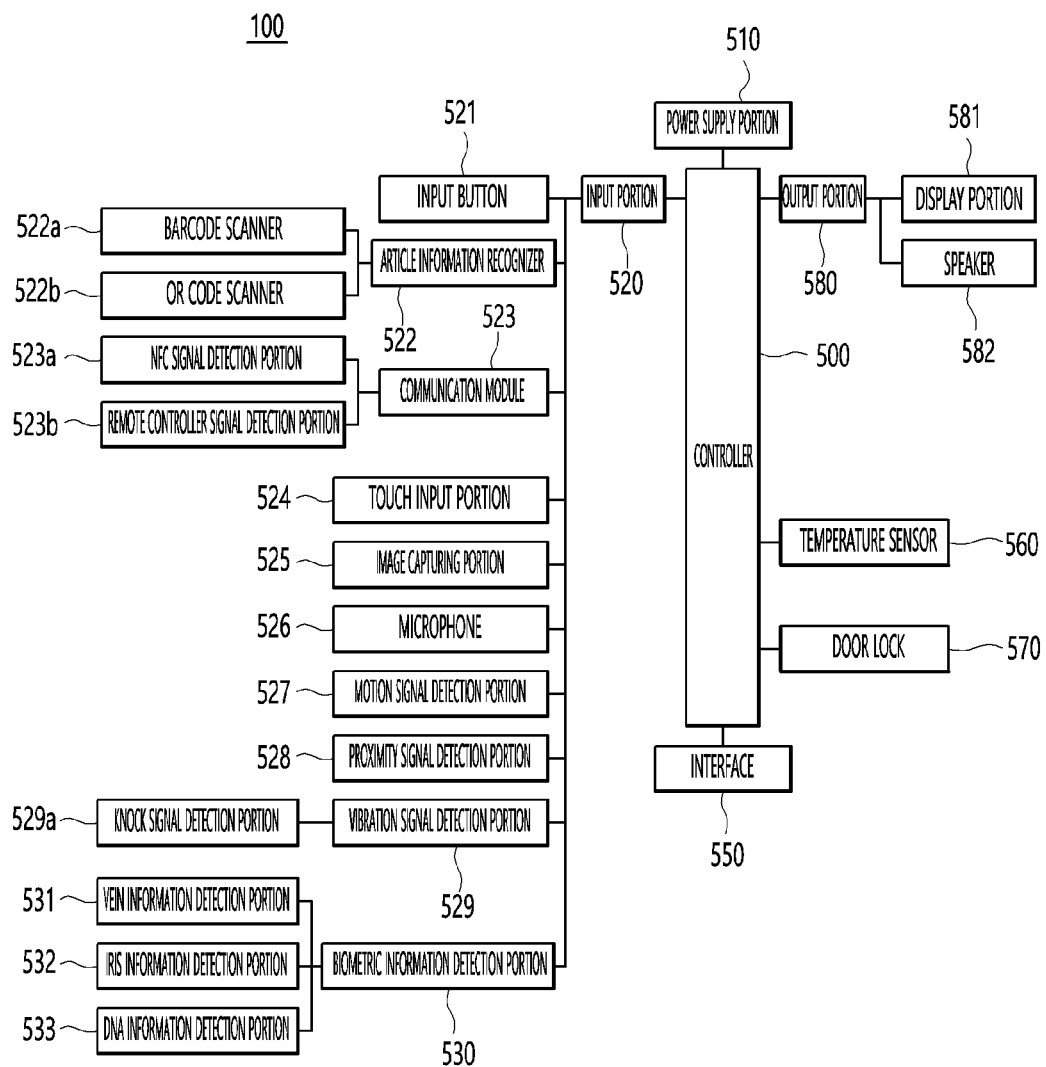
FIG. 10 is a block diagram illustrating a control configuration of the refrigerator for the entrance gate according to an embodiment of the present invention.

FIG. 10 is a block diagram illustrating a control configuration of the refrigerator for the entrance gate according to an embodiment of the present invention.

Referring to FIG. 10, the refrigerator 100 for the entrance gate according to an embodiment of the present invention includes an electronic controller (processor) 500, a power supply portion 510, an input portion 520, an output portion 580, a temperature sensor 560, a door lock 570, and an interface 550.

In detail, the input portion 520 includes a means for allowing a user or a delivery person including a delivery driver to input various information into the controller 500.

For example, the input portion 520 includes at least one or more of an input button 521, an article information recognizer 522, a communication module 523, a touch input portion 524, an image capturing portion 525, a microphone 526, a motion signal detection portion 527, a proximity signal detection portion 528, a vibration signal detection portion 529, and a biometric information detection portion 530.

The input button 521 may include a mechanical button installed around a display portion 180 of the refrigerator 100 for the entrance gate and manipulated by the user or the delivery person by applying a predetermined pressure with a finger thereof. The input button 521 may include an input switch or a pressure sensor using a piezo sensor.

The input button 521 may be installed at one side of the cabinet 110 as well as the outdoor-side door 180.

The article information recognizer 522 may include any one or both of a barcode scanner 522a for recognizing a barcode printed or attached to a packaging box of a product and a QR code scanner 522b for recognizing a QR code.

The communication module 523 may include an NFC signal detection portion 523a for recognizing a signal transmitted from a near field communication (NFC) module built in a user's mobile phone and a remote controller signal detection portion 523b for recognizing a signal transmitted from the remote control.

The touch input portion 524 may include a touch screen displayed on a screen of the display portion 150. The touch input portion 524 may include a capacitive touch button that detects an input signal by detecting a change in capacitance, which occurs when a user's finger approaches or touches the screen.

The image capturing portion 525 may include an image analysis camera provided at one front side of the outdoor-side door 180 to capture a facial image of the user or delivery person or a camera (not shown) for recognizing a user's fingerprint in addition to a camera 118 mounted inside the storage compartment 110a.

The proximity signal detector 528 may include an infrared sensor (IR sensor) including an infrared transmitter and receiver.

The vibration signal detection portion 529 may include a knock signal detection portion 529a that detects vibration or sound waves generated when the user knocks the display portion 150 by hands thereof.

In addition, the biometric information detection portion 530 includes at least one of a vein information detection portion 531 detecting a user's vein map, an iris information detection portion 532 detecting a user's iris, or a DNA information detection portion 533 recognizing user's genetic information.

Also, the output portion 580 may include a display portion 581 on which an image or video information is output. The display portion 581 means a display portion 150 (see FIG. 1) provided on the outdoor-side door 180.

In addition, the output portion 580 may further include a speaker 582 for outputting various alarm sounds, multimedia playback sounds, or guide sounds. The speaker may be described as an example of a sound output portion.

The door lock 570 may include a door lock means including the above-described latch 158. The door lock 570 is provided to prevent the indoor-side door 170 or the outdoor-side door 180 from being arbitrarily opened or prevent the outdoor-side door 180 form being opened by an unauthorized person.

The temperature sensor 534 is installed in the storage compartment 110a to detect a temperature of the storage compartment 110a.

In addition, the refrigerator 100 for the entrance gate may further include the interface 550, and the interface 550 functions as a passage for connecting various external devices. As an example, the interface 550 may include a wired/wireless data port to which a data storage device including a USB or an SD card is connected.

Figure 11:
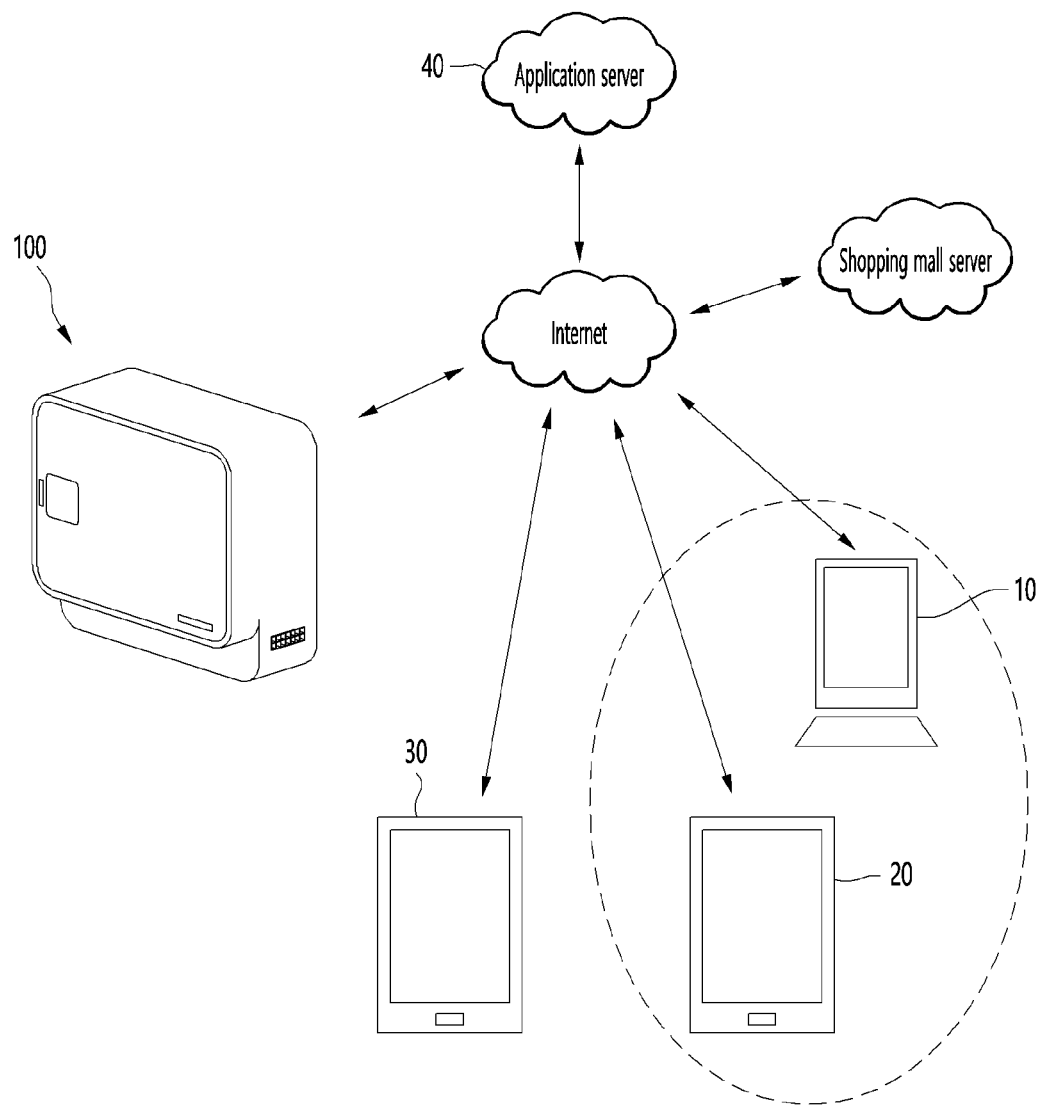
FIG. 11 is a view illustrating a network system for controlling the refrigerator for the entrance gate according to an embodiment of the present invention.

FIG. 11 is a view illustrating a network system for controlling the refrigerator for the entrance gate according to an embodiment of the present invention.

Referring to FIG. 11, the refrigerator 100 for the entrance gate according to an embodiment of the present invention is communicatively connected to a terminal of the user through the Internet.

In addition, the user's terminal is communicatively connected to an application server 40 and a shopping mall server 50 of a control application through the Internet.

In addition, the user's terminal is communicatively connected to the controller 500 of the refrigerator for the entrance gate through the Internet.

In detail, the user terminal may include a fixed terminal including the computer 10 or a mobile device 20 including a portable terminal such as a smart phone. The delivery person's terminal 30 may include a mobile device or a PDA terminal.

When the user accesses the Internet using the computer 10 or the mobile device 20 to purchase an article at a shopping mall connected to the Internet, information on the purchased article and/or authentication-related information is transmitted to the controller 100 of the refrigerator 100 for the entrance gate and then is stored in a memory or a separate server connected to the controller.

That is, since information on the refrigerator 100 for the entrance gate is registered in the corresponding shopping mall server, the server 50 of the corresponding shopping mall may directly transmit the information to the controller 500 of the refrigerator 100 for the entrance gate. For this, when the user registers for a membership in the corresponding shopping mall site, the information on the refrigerator 100 for the entrance gate may need to be registered.

Alternatively, the information on the purchased article may be transmitted from the shopping mall server 50 to the user's mobile device 20. Then, the control application installed in the user's mobile device 20 may read information about the purchased article stored in the user's mobile device 20 to transmit the information to the application server 40. Then, the application server 40 may transmit the information on the purchased article and/or authentication-related information to the controller 500 of the refrigerator 100 for the entrance gate.

At the same time, the information and/or authentication-related information on the purchased article may be transmitted to the server of a courier company and transmitted to the delivery person's terminal 30. The Information on the purchased article may be transmitted to the delivery company server in the form of an encryption code, for example, a barcode or QR code, and the delivery company may attach the encryption code to a packaging box of the purchased product.

In addition, the authentication-related information may be transmitted to the server of the delivery company together with the information on the purchased article and then finally transmitted to the delivery person's terminal 30 or may be transmitted to the user who purchased the article.

Alternatively, at least one or all of the encryption code and authentication-related information may be directly generated by the user. If the user directly generates the encryption code and/or authentication-related information, when the user receives a number of the delivery person's terminal 30 from the courier company, the encryption code and authentication-related information and/or authentication-related information may be directly transmitted to the delivery person's terminal 30. This will be described in more detail with reference to the accompanying drawings.

The user may access the Internet through the computer 10 or the mobile device 20 and may access or log in to the shopping mall site or the mart site for selling goods.

The method for accessing and logging in to the shopping mall site or the mart site includes a method for directly accessing the address of the corresponding shopping mall site, or a method for logging in the control application installed in the user's mobile device 20 and then logging in the corresponding shopping mall or mart site.

Here, since the terminal 30 of the delivery person is controlled by a server of the delivery company or the post office, the terminal 30 of the delivery person may be interpreted as the same meaning as the server of the delivery company or the post office.

When the user accesses the shopping mall and purchases a desired article, information related to authentication of purchase article information may be transmitted from the server of the corresponding shopping mall to the user's mobile device 20. Then, the article information and the authentication information may be stored in the application server through the control application installed in the user's mobile device 20.

Alternatively, the article information and authentication information are directly transmitted from the shopping mall server 50 to the application server 40 through the Internet or directly transmitted from the shopping mall server 50 to the application server 40, the controller 500 for the refrigerator for the entrance gate, and the server of the delivery company.

In order to transmit the information from the server of the shopping mall, in which the user logs in to purchase the article, to the controller of the refrigerator 100 for the entrance gate, when the user accesses the shopping mall to register for a membership, a unique number or a unique code of the refrigerator 100 for the entrance gate has to be input.

The delivery person of the delivery company delivers the ordered article to the front of the refrigerator 100 for the entrance gate of the user and brings the authentication information to the encryption code scanners 522a and 522b provided on the door of the refrigerator 100 for the entrance gate. As a result, the outdoor-side door 180 of the refrigerator 100 is opened so that articles is stored.

Figure 12:
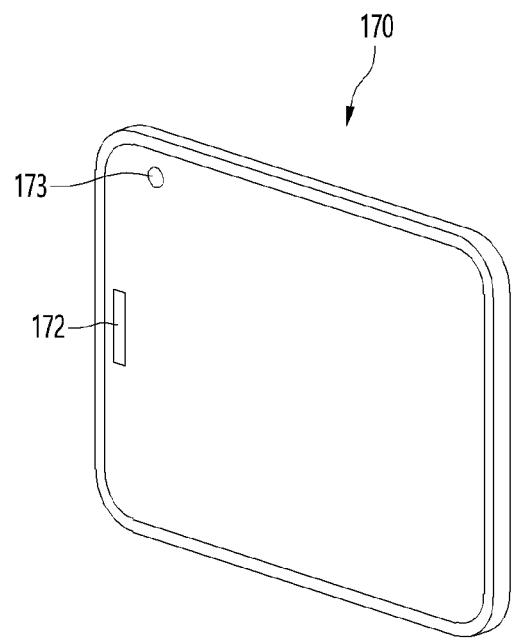
FIG. 12 is a front view illustrating an inner door constituting the refrigerator for the entrance gate according to an embodiment of the present invention.

FIG. 12 is a front view illustrating an inner door constituting the refrigerator for the entrance gate according to an embodiment of the present invention.

Referring to FIG. 12, in the inner door 170 of the refrigerator 100 for the entrance gate according to an embodiment of the present invention, in addition to the pressing portion 172, at least one of a notification light 173, a face capturing portion 174, a pressure detection portion (not shown), an acceleration sensor (not shown), or a latch sensor (not shown) may be provided.

In detail, the notification light 173 may be understood as a means for notifying that the article is currently being stored in the storage compartment 110a of the refrigerator 100 for the entrance gate to the user or family member in the indoor room when incoming of the article is completed, and the outer door 180 is closed.

The notification light 173 may be a light emitting means using an LED as a light source and may be programmed to be maintained in a turned on state or in a flickering state when the article is being stored.

Figure 13:
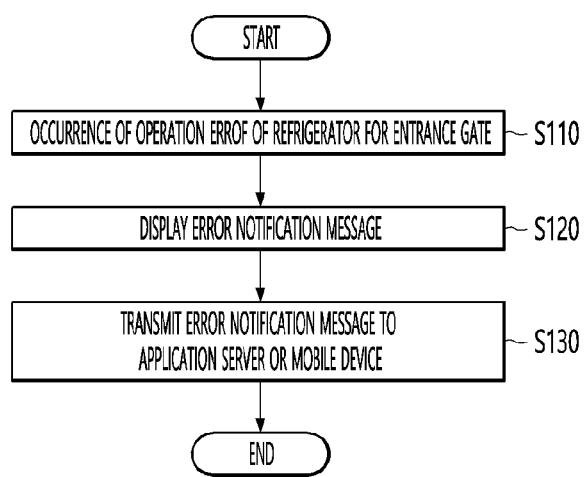
FIG. 13 is a failure control algorithm performed when a failure situation occurs in the refrigerator for the entrance gate according to an embodiment of the present invention.
Figure 14:
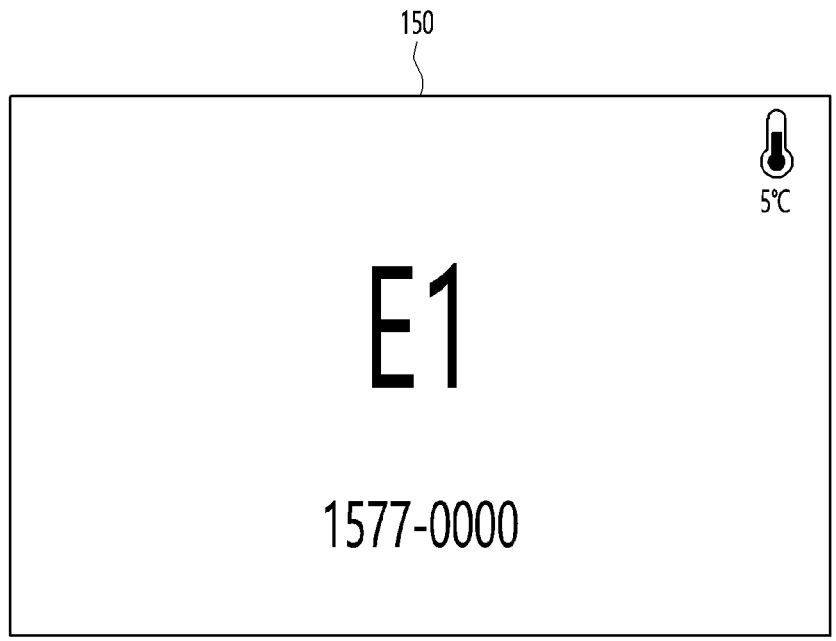
FIGS. 14 and 15 are views illustrating an internal configuration of the refrigerator for the entrance gate while the failure control algorithm is performed.
Figure 15:
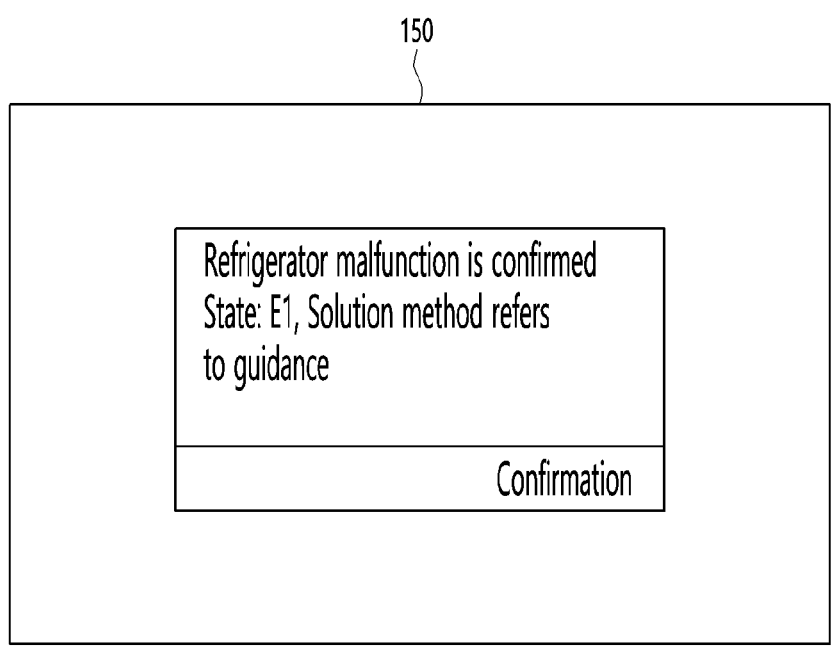
Figure 16:
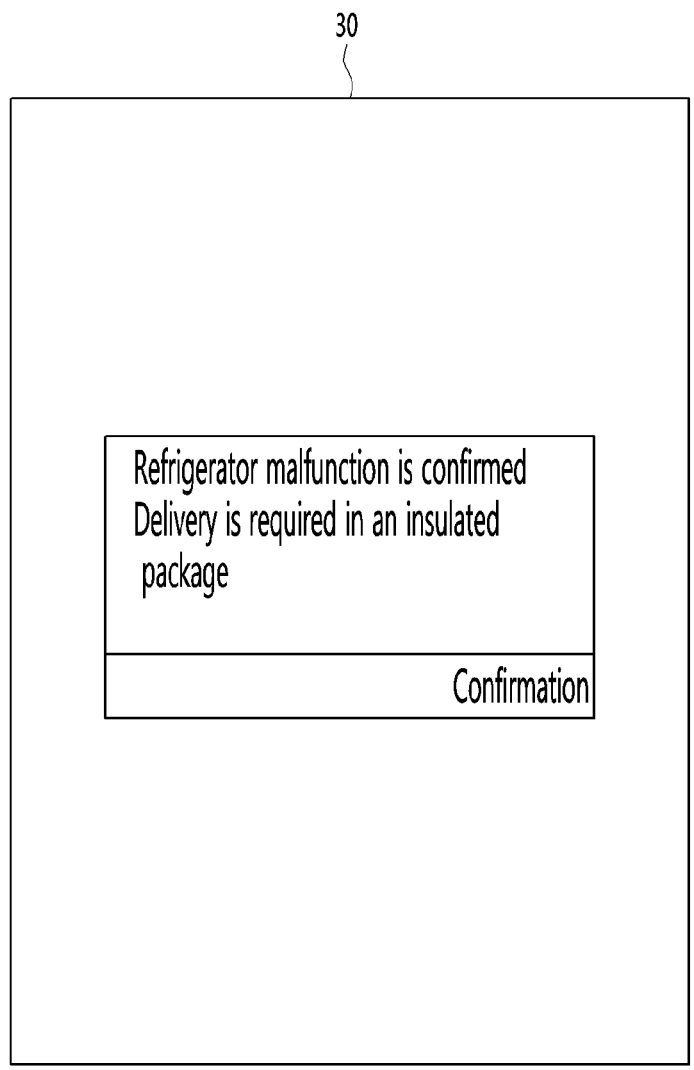
FIG. 16 is a view illustrating a message transmitted to a terminal of a delivery person when a malfunction of the refrigerator for the entrance gate occurs.

FIG. 13 is a failure control algorithm performed when a failure situation occurs in the refrigerator for the entrance gate according to an embodiment of the present invention, FIGS. 14 and 15 are views illustrating an internal configuration of the refrigerator for the entrance gate while the failure control algorithm is performed, and FIG. 16 is a view illustrating a message transmitted to a terminal of a delivery person when a malfunction of the refrigerator for the entrance gate occurs.

Referring to FIG. 13, when an operation error of the refrigerator for the entrance gate occurs (S110), the controller 500 outputs an error notification message to the display portion 150 (S120).

In detail, as illustrated in FIG. 14, the error notification message may include a character code or a numeric code indicating types of errors and may further include a phone number for after-sales service request.

The types of errors may be defined as a combination of letters and numbers, such as "E1, E2, E3, . . . , En", but is not limited thereto.

For example, E1 means abnormal opening of the outer door, E2 means abnormal network of the refrigerator 100 for the entrance gate, and E3 is defined as a screen error of the display portion 150 provided in the outer door 180.

As described above, the content of the error defined for each error code is described in the product manual booklet so that the user refers to the content of the error.

Referring to FIG. 15, it is also possible to display a guide text for explaining what an operation error actually occurred, on the display portion 150. In this case, the case where the type of the error is an abnormal screen of the display portion may be excluded. In the case of the abnormal screen of the display portion, for example, it may be output in the form of a sound message through the speaker.

On the other hand, the error notification message is output to the display portion 150, and at the same time, the error notification message is transmitted to the application server 100 or the mobile device through a wireless network connected to the refrigerator 100 for the entrance gate.

In detail, when the error notification message is transmitted from the controller 500 of the refrigerator 100 for the entrance gate to the application server 400, the application server 400 transmits the message to the user's mobile device 32.

When the user's mobile device 20 is running in the control application of the refrigerator for the entrance gate, an error notification message is output on the screen of the mobile device 20. If the control application is not running, a message reception notification function is activated so that the user is capable of recognizing a message reception.

If the user's mobile device 20 is in a short distance from the front door refrigerator 100, and a near filed communication module of the mobile device 20 including Bluetooth, etc. and a near field communication module of the refrigerator 100 for the entrance gate are synchronized, it may be possible to directly transmit the error notification message from the controller of the refrigerator 100 for the entrance gate to the mobile device 20.

On the other hand, as illustrated in FIG. 16, when an operation error of the refrigerator 100 for the entrance gate occurs, there is a high possibility that the delivered article is not stored in a refrigerated or warm state, and thus, a request message including the error message may be transmitted from the controller 500 of the refrigerator 100 for the entrance gate to the server of the delivery company. This may be possible by transmitting a server address of the delivery company together when the order information is transmitted from the shopping mall server to the controller 500 of the refrigerator 100 for the entrance gate.

As illustrated in the drawings, the request message may include a message for requesting the article to be delivered in cold packaging or thermal insulation packaging in preparation for the possibility that cold storage or warm storage is difficult. Then, the delivery company may reflect this in the packaging process for the article delivery so that the cooling or warming function is maintained during the delivery process.

Alternatively, when the error message is transmitted from the controller 500 of the refrigerator 100 for the entrance gate to the application server 400, the application server 400 may determine the type of error. If it is determined that the error to send the cold or warm packaging request message to the delivery company, the application server 400 may be programmed to transmit the request message to the server of the delivery company.

Referring to FIG. 16, the delivery company server transmits the error message to the delivery person's terminal 30, and the fact that the refrigerator 100 for the entrance gate, which is installed at the delivery location, is currently in a malfunction state, and the fact that the cold packaging or thermal insulation packaging is required may be awarded.

Figure 17:
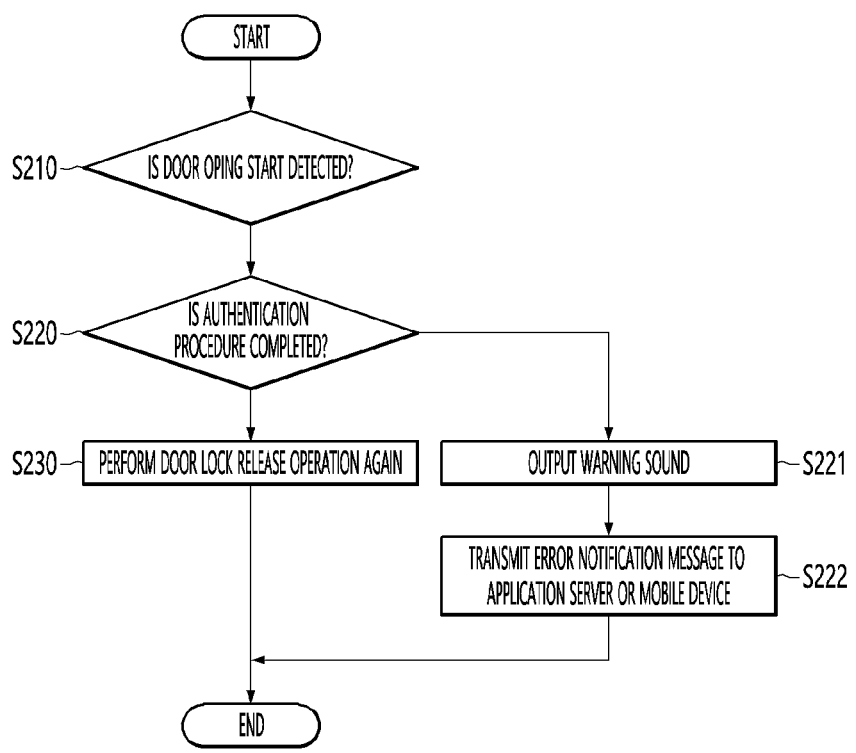
FIG. 17 is a flowchart illustrating a control method performed when an attempt to forcibly open an outer door of the refrigerator for the entrance gate occurs.
Figure 18:
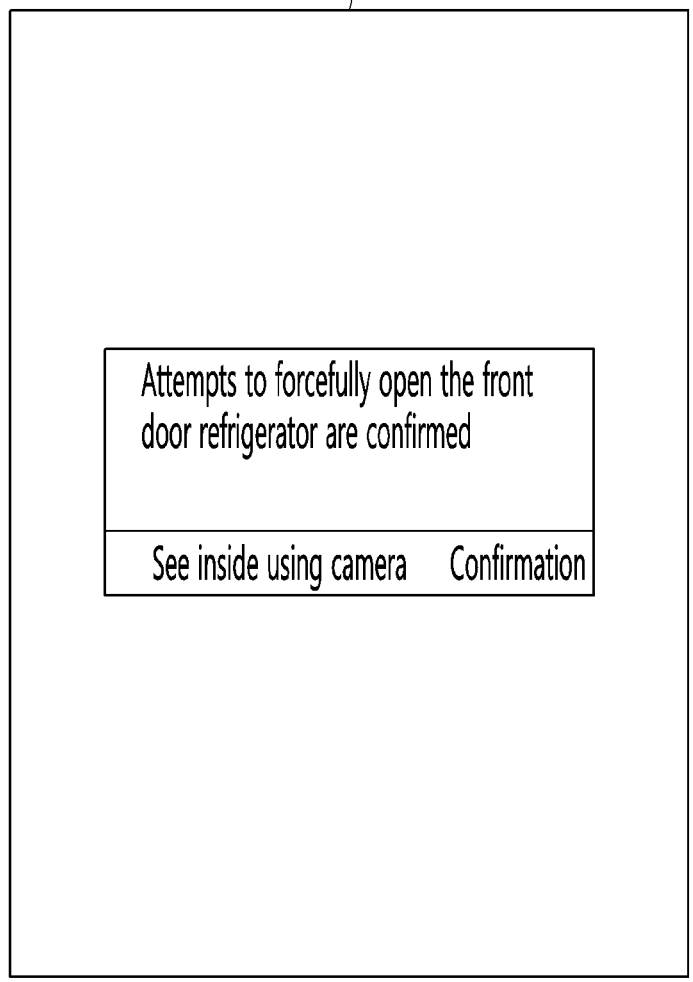
FIG. 18 is a view illustrating a message output on a display portion of a user's mobile device when a forced opening attempt occurs.

FIG. 17 is a flowchart illustrating a control method performed when an attempt to forcibly open the outer door of the refrigerator for the entrance gate occurs, and FIG. 18 is a view illustrating a message output on the display portion of the user's mobile device when a forced opening attempt occurs.

Referring to FIG. 17, when an attempt to forcibly open the door is detected (S210), the controller 500 of the refrigerator 100 for the entrance determines whether the authentication procedure is normally completed (S220).

Here, the attempt to open the door forcibly means not only the act of pulling by applying external force to the outer door 180 in order to forcibly open the outer door 180 while the outer door 180 is locked, but also the act of tapping by applying external force to the front surface of the door 180.

In addition, a sensor for detecting that the outer door 180 is forcibly pulled may be mounted. As an example of the sensor, a push switch mounted on a refrigerator body that is in contact with the rear surface of the door may be applied to detect the door opening of the general refrigerator, but is not limited thereto.

Alternatively, an acceleration sensor is mounted on the outer door 180 to detect an acceleration generated when the outer door 180 is pulled forward, and when the acceleration exceeds a set value, the controller 500 may determine that an attempt to open the outer door 180 occurs.

In addition, an external force detection sensor may be mounted on the outer door 180 to detect external force applied to the front surface of the outer door 180. The external force detection sensor may include, for example, a pressure sensor that detects an impact amount or a pressure.

If it is determined that there is the attempt to open the outer door 180 while the outer door 180 is locked, the controller 500 may redetermine whether the authentication procedure for opening the outer door 180 is normally performed, or a completed history of the authentication procedure is recorded before the attempt to open the door (S220). The reason for determining whether to perform the authentication procedure is because a situation in which the outer door 180 is not opened even though the authentication process is normally performed due to a failure or malfunction of the door lock.

Therefore, if it is determined that there is the attempt to open the door after the authentication procedure is normally performed, the controller 500 performs the door unlocking operation again (S230).

If it is determined that there is the attempt to open the door while the authentication procedure is not performed, the controller 500 outputs a warning sound through the speaker (S221), and at the same time, transmits a warning message to the application server 400 or the user's mobile device 20 (S222).

The warning message transmitted to the application server is received by the refrigerator control application installed in the user's mobile device 20 through the wireless network, and a message arrival notification signal is output to the user.

Alternatively, if the user's mobile device 20 and the controller 500 of the refrigerator 100 for the entrance gate are communicatively connected by the near field wireless communication such as Bluetooth, the refrigerator 100 for the entrance gate directly transmits the warning message to the mobile device 20.

As illustrated in FIG. 18, the message transmitted to the user's mobile device 20 may include a message indicating that the attempt to forcibly open the external door of the refrigerator for the entrance gate is confirmed, and also, a selection button additionally taken by the user may be displayed.

For example, as illustrated in the drawings, the camera installed in the storage compartment 110*a* of the refrigerator 100 for the entrance gate may operate to display a menu for selecting a function to view the inside of the storage compartment.

Alternatively, if the face recognition camera is installed at one side of the outer door 180, the face recognition camera operates to display a menu for capturing a face of a person attempting to open the door and transmitting the captured image to the mobile device 20.

Figure 19:
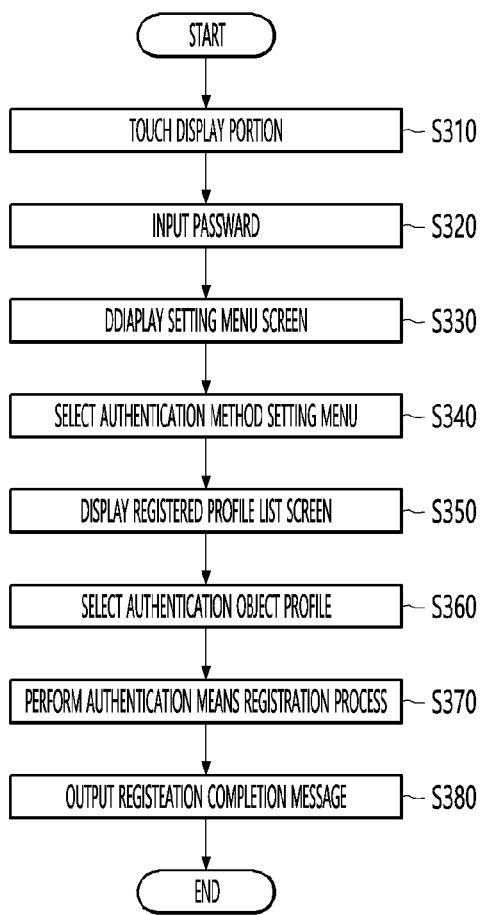
FIG. 19 is a flowchart illustrating a process of setting a user authentication method through a display portion of the refrigerator for the entrance gate according to an embodiment of the present invention.

FIG. 19 is a flowchart illustrating a process of setting a user authentication method through a display portion of the refrigerator for the entrance gate according to an embodiment of the present invention, and FIGS. 20 to 26 are views illustrating a user interface displayed on a display portion in the process of setting the user authentication method.

A process of setting a user authentication method will be described with reference to FIGS. 19 to 26 together.

Referring to FIG. 19, in order to set the user authentication method, the user first touches the display portion 150 of the refrigerator 100 for the entrance gate (S310).

Figure 20:
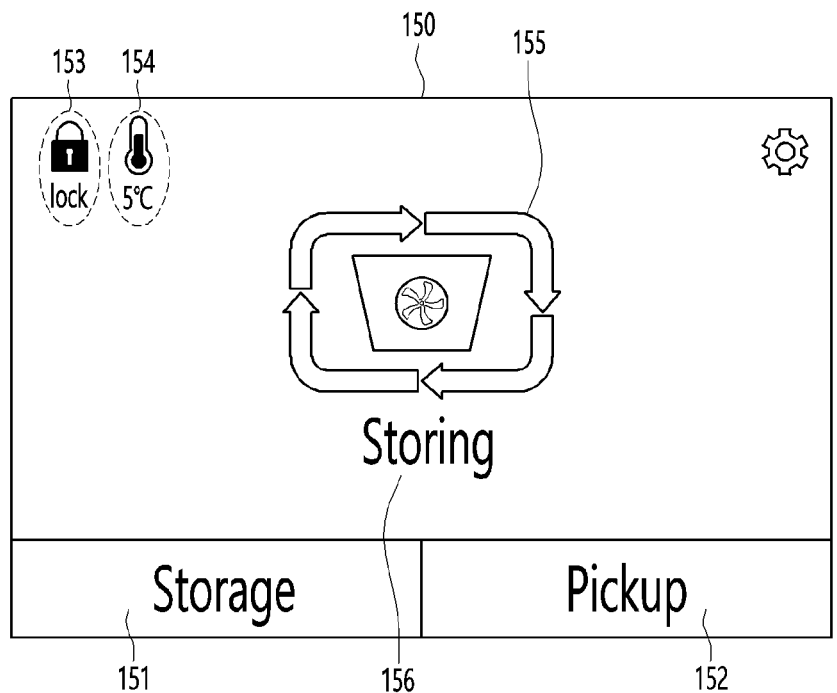
FIGS. 20 to 26 are views illustrating a user interface displayed on a display portion in the process of setting the user authentication method.

In a state in which no command is input, the display portion 150 of the refrigerator 100 for the entrance gate outputs a screen as illustrated in FIG. 20.

In detail, an incoming button portion 151 and an outgoing button portion 152 may be provided in the form of touch buttons at a lower side of the display portion 150. The incoming button portion 151 is a button for the delivery person of the delivery company, and the outgoing button portion 152 may be understood as a button for the user.

In addition, a refrigerating mode operation display portion 155 is formed at a substantially central portion of the display portion 150. The refrigerating mode operation display portion 155 may be displayed on the display portion 150 in the form of an image or a moving picture to inform a user or a delivery person that the inside of the storage compartment 110*a* is currently maintained in the refrigerated state.

In addition, a storage state display portion 156 for displaying whether an article is currently in the storage compartment 110*a* in the form of text or image may be formed on an area between the refrigerating mode operation display portion 155 and the button portions 151 and 152.

In addition, a lock state display portion 153 showing a locked state of the outer door 180 and an internal temperature display portion 154 showing an internal temperature of the storage compartment may be formed at one upper corner of the display portion 150.

Also, a setting menu icon 156 may be displayed on the other upper corner of the display portion 150.

The setting menu screen is touched by the user to be converted into the setting menu icon 156. In the process of setting the authentication method according to the present invention, the user may select the setting menu icon 156 while the setting menu screen is displayed on the display portion 150.

Alternatively, a long press operation of pressing a point on the display portion 150 for a set time may be performed by the user to be converted into the setting menu screen.

The process of touching the display portion (S310) may be understood to mean the long press operation in which the user directly touches the setting menu icon 156 to press the screen of the display portion for a long time.

Here, when the display portion 150 is touched, it is possible to be directly converted into the setting menu screen, but for security, a password input process (S320) may be performed in the middle.

Figure 21:
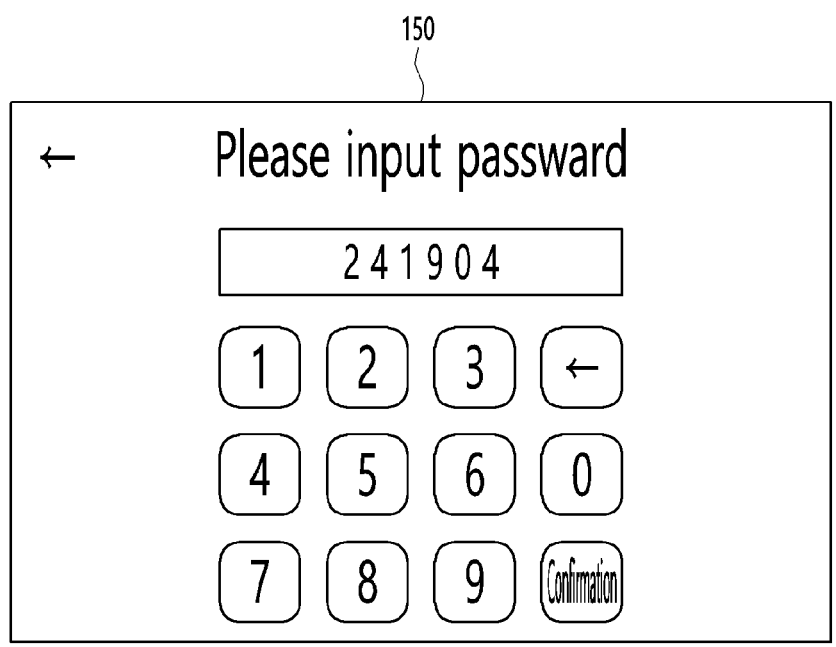

In detail, when the user touches the display portion 150, the password input screen as illustrated in FIG. 21 is displayed. When performing the process of setting the authentication method for a first time, the password may be a number set at the time of product release, such as 000000 or 111111.

Figure 22:
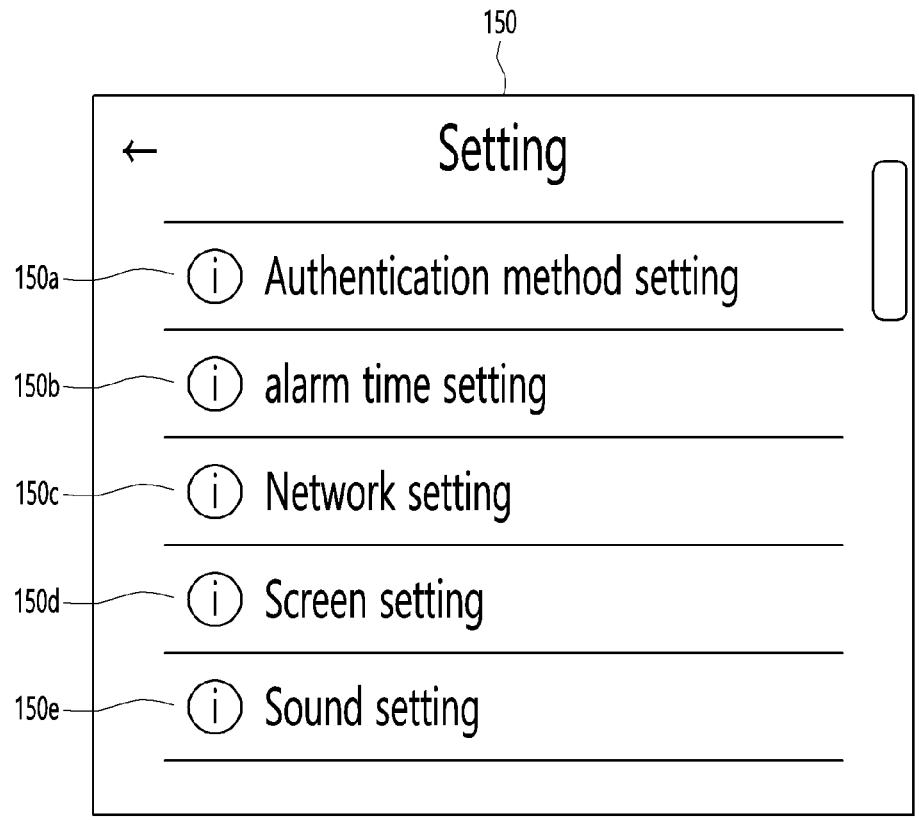

When the password input is finished, the setting menu screen as illustrated in FIG. 22 is displayed on the display portion 150 (S330).

A plurality of setting menus may be listed and displayed on the setting menu screen.

For example, the setting menu includes at least one of an authentication method setting menu 150a, a notification time setting menu 150b, a network setting menu 150c, a screen setting menu 150d, and a sound setting menu 150e.

Figure 23:
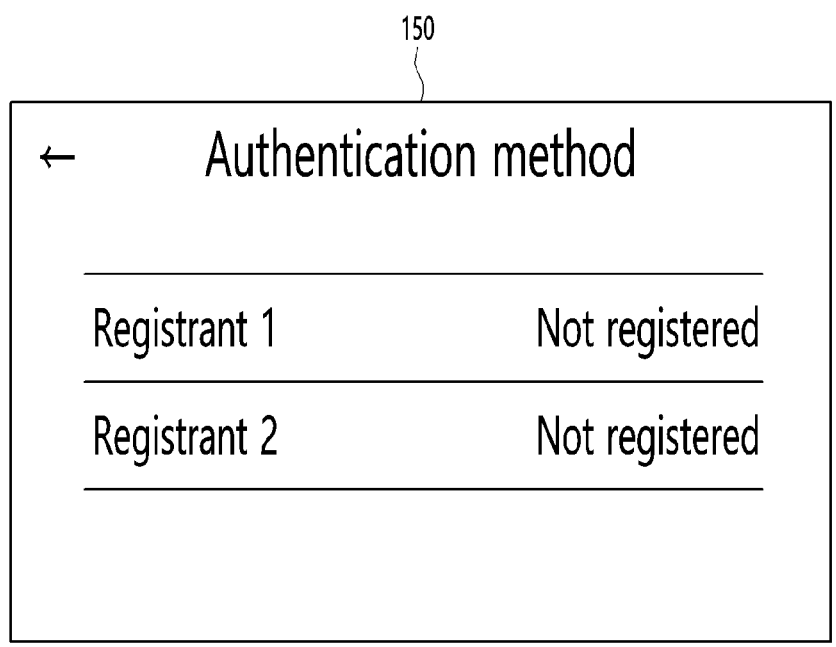

In addition, when the authentication method setting menu 150a is selected (S340), a registered profile list screen as illustrated in FIG. 23 is displayed (S350).

Referring to FIG. 23, in the registered profile list, when the user accesses the control application of the refrigerator for the entrance gate, which is installed in the mobile device 20, to input and store one or more user profiles, the input profile is transmitted to the refrigerator 100 for the entrance gate via the application server 400. Accordingly, there is an advantage in that the inconvenience of inputting the user profile by touching the display portion 150 of the refrigerator 100 for the entrance gage outside the entrance gate is eliminated.

The user's name or nickname and whether or not to be registered as the user may be listed on the registered profile list.

Figure 24:
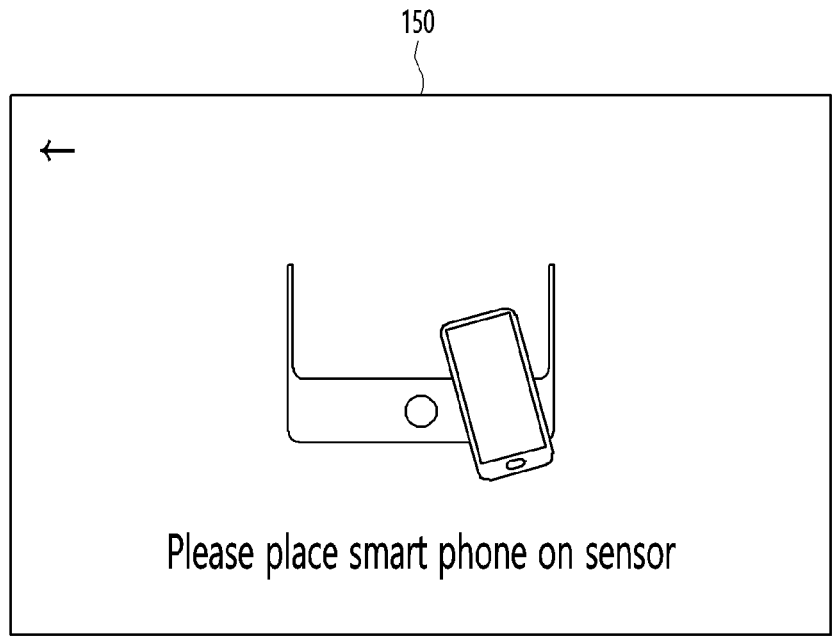

In this state, when the user touches and selects an authentication target profile (S360), an authentication screen as illustrated in FIG. 24 is displayed.

In the state in which the authentication screen is displayed, the user's mobile device with the NFC module turned on is brought to the display portion to perform an authentication means registration process (S370). Then, a text or voice message indicating that registration is complete is output (S380), and the process of setting the authentication method is terminated.

Figure 25:
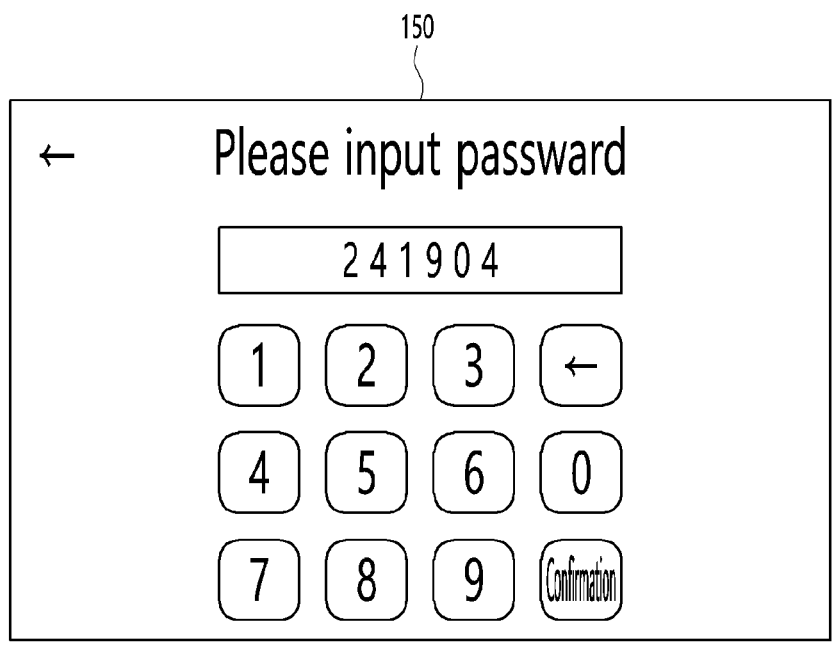

In the authentication process, in addition to the NFC authentication using the mobile device 20, it is also possible to further perform a password input process as illustrated in FIG. 25. The password input process may include a first process for setting a passage by the user and a second process of inputting the passage by the user in order to confirm whether the input password is correct.

Also, when the password input process is finished, the password is changed from the password set in the product release state to a new password, and a voice indicating that the user authentication method has been changed is outputted, or a character is displayed on the display portion 150.

Thereafter, if the password input screen is displayed by touching the setting menu again or by long-pressing the display portion for new user authentication, the changed password has to be input to proceed to the next process.

Figure 26:
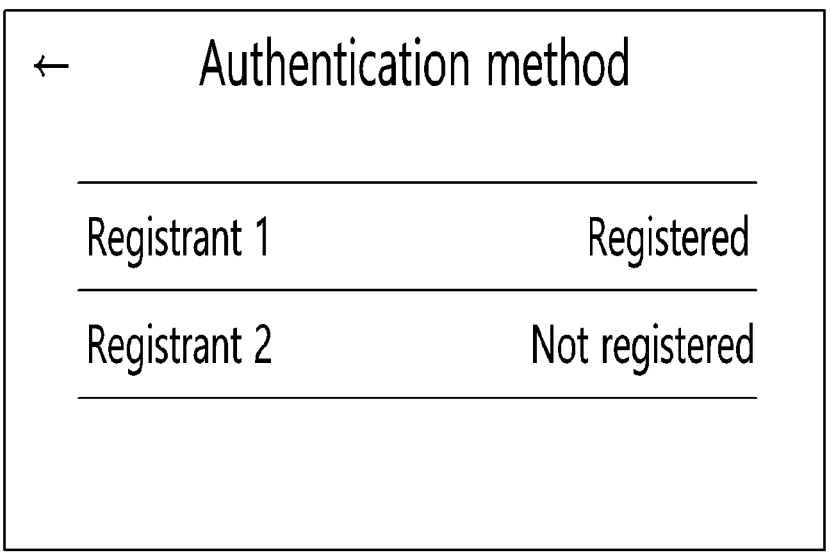

When the authentication method process is completed, as illustrated in FIG. 26, the character "not registered" displayed next to the authentication target profile may be changed to the character "registered" and displayed.

Figure 27:
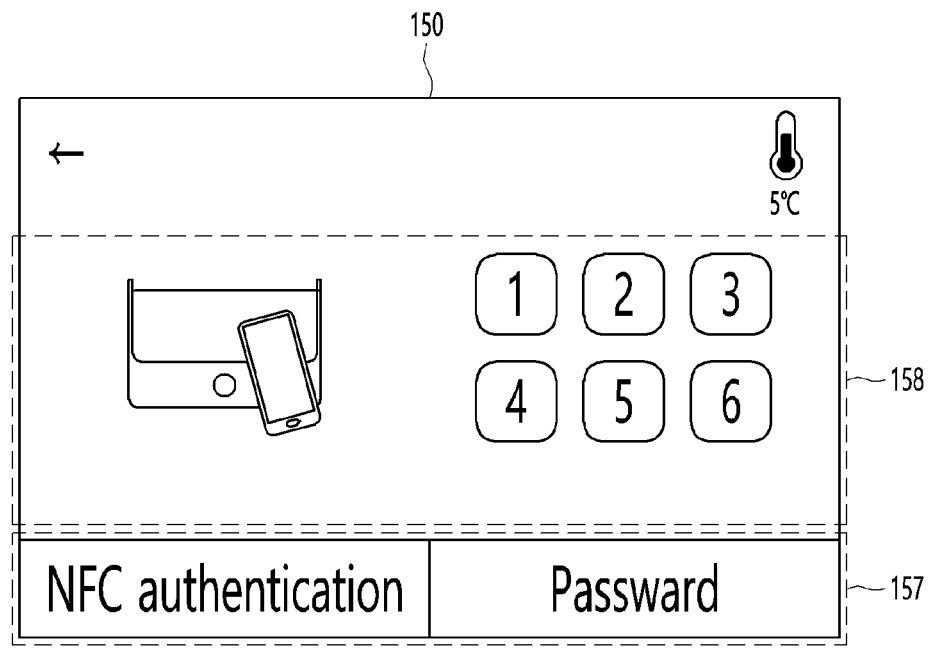
FIG. 27 is a view illustrating a user authentication screen for opening the outer door of the refrigerator for the entrance gate.

FIG. 27 is a view illustrating the user authentication screen for opening the outer door of the refrigerator for the entrance gate.

Referring to FIG. 27, when the user intends to take out a stored article by opening the outer door 180, the user authentication process has to be performed.

In detail, in order to determine whether the person who is allowed to open the outer door 180 is touched, the user authentication screen as illustrated in this figure is displayed when the pickup button is touched.

Here, an authentication method selection portion 157 and an authentication method guide portion 158 disposed above the corresponding authentication method may be displayed on the display portion so that the user selects any one of the authentication through NFC authentication of the mobile device and authentication through the password input.

Alternatively, only one of the NFC authentication and the password authentication is displayed, so that the authentication is performed by only one method.

The user may touch any one of the touch buttons displayed on the authentication method selection unit 157 to perform a desired authentication process.

As another method, the NFC authentication screen is output by default, so that the authentication through the mobile device 20 is performed, and when the NFC authentication through the mobile device 20 is failed, the authentication through the password input may be performed.

If it is determined that the registrant is allowed to open the outer door 180 through the authentication process as described above, the controller 500 allows the outer door 180 to be opened so that the user takes out the stored article.

When the article outgoing command is input, the controller may be configured to output the authentication method selection portion, which allows the user to select any one of the NFC authentication method and the password authentication method, on the display portion in the touch button shape.

In detail, when the article outgoing command is input, the controller may be configured to output the NFC authentication screen on the display portion to perform the NFC authentication process and open the outdoor-side door when the input NFC information matches with the registered NFC information.

When the input NFC information does not match with the registered NFC information, or it is impossible to perform the NFC authentication procedure, the controller may be configured to output the password input screen on the display portion to perform the password authentication process.

FIG. 28 is a view illustrating an operation of the display portion of the refrigerator for the entrance gate according to detection results of a proximity signal detection portion.

Referring to FIG. 28, when a proximity signal detection portion 528 such as an infrared sensor is mounted on the front of the outer door 180 of the refrigerator 100 for the entrance gate, and the proximity signal detection portion 528 detects person's approach, an advertisement of the delivery company or the distribution company may be displayed on the display portion 150.

In detail, since the outer door 180 of the refrigerator 100 for the entrance gate is exposed to the outdoor corridor, the display portion 150 provided on the outer door 180 has a very high utility value as an advertisement means.

Thus, when an unspecified person approaches near to the outer door 180 of the refrigerator 100 for the entrance gate, the proximity signal detecting unit 528 may detect the unspecified person. Also, when the proximity signal detecting portion 528 detects the person's approach, the display portion 150 may be activated regardless of whether the approaching person has the right to open the outer door 180.

When the display portion 150 is activated, an advertisement picture or image may be displayed at the same time.

Alternatively, if it is determined that the person who has the right to open the outer door 180 among those whose access is detected by the proximity signal detection portion 528 is displayed, the article storage or pickup menu is displayed, and only when it is determined as a person who does not have the right to open the door, the advertisement screen may be displayed.

Referring to (a) of FIG. 28, when the proximity signal detection portion 528 does not detect the person's approach, the display portion 150 may be maintained in the inactive state, and when the person's approach is detected, the display portion 150 may display the advertisement screen as illustrated in (b) of FIG. 28.

In addition, if the proximity signal detecting portion 528 does not detect the person's approach from the time point at which the advertisement is finished until a set time elapses, the display portion 150 may return to the inactive state.

What is claimed is:

1. A refrigerator installable at a door or a wall, comprising:
    a cabinet having a storage compartment to store an article;
    an outdoor-side door connected to a front surface of the cabinet to open or close the storage compartment;
    an indoor-side door connected to a rear surface of the cabinet to open or close the storage compartment, the indoor-side door facing the outdoor-side door;
    a display portion provided on a front surface of the outdoor-side door;
    a cold air supply device disposed in the cabinet, the cold air supply device to supply cold air to the storage compartment, and
    a controller configured to control driving of the cold air supply device and the opening of the outdoor-side door,
    wherein the controller is configured to:
    store a user authentication profile registered through a user authentication setting process; and
    open the outdoor-side door when a user authentication corresponds with the user authentication profile in a state where an article outgoing command is detected,
    wherein, when the article outgoing command is detected, the controller is configured to:
    display an NFC authentication screen on the display portion to perform an NFC authentication process; and
    open the outdoor-side door when the received NFC information matches with the registered NFC information.

2. The refrigerator according to claim 1, wherein the controller is configured to:
    detect a touch of the display portion and display a setting menu screen on the display portion;
    detect a selection of an authentication setting menu and display a registered profile list on the display portion;
    perform the user authentication setting process when an authentication target profile selection is detected; and
    display a user registration completion message when a completion of the user authentication setting registration process is detected.

3. The refrigerator according to claim 2, wherein the user authentication profile registered in the user authentication setting process comprises at least one of an NFC of a mobile device and a password.

4. The refrigerator according to claim 3, wherein the controller is configured to:
    perform an authentication procedure of determining whether an NFC information or a password which is received through the display portion matches with an NFC information or a password registered in the user authentication profile registration process, in the state where the article outgoing command is detected; and
    open the outdoor-side door when the determination of the authentication procedure is that there is a match.

5. The refrigerator according to claim 1, wherein when the controller detects an attempt to open the outdoor-side door in a state where the article outgoing command is not detected, the controller is configured to transmit a warning message to a user's mobile device together with a warning sound.

6. The refrigerator according to claim 5, wherein the controller is configured to:
    operate a camera mounted inside the storage compartment or on the outdoor-side door to capture an inside of the storage compartment or a front side of the outdoor-side door, respectively, when detecting the attempt to open the outdoor-side door is detected in the state where the article outgoing command is not detected; and
    transmit a captured image to the user's mobile device.

7. The refrigerator according to claim 1, further comprising a notification light disposed at the indoor-side door to notify that the article is stored in the storage compartment.

8. The refrigerator according to claim 1, wherein, when the article outgoing command is detected, the controller is configured to output an authentication method selection portion, which allows a user to select any one of an NFC authentication method and a password authentication method, on the display portion in a touch button shape.

9. The refrigerator according to claim 1, wherein, when the received NFC information does not match with the registered NFC information, or the NFC authentication procedure cannot be performed, the controller is configured to display a password input screen on the display portion to perform an password authentication process.

10. A method of operating a refrigerator installable at a front door or a wall, the refrigerator comprising a cabinet having a storage compartment to store an article, an outdoor-side door connected to a front surface of the cabinet to open or close the storage compartment, an indoor-side door connected to a rear surface of the cabinet to open or close the storage compartment, the indoor-side door facing the outdoor-side door, a display portion provided on a front surface of the outdoor-side door, and a controller, the method comprising:
    storing a user authentication profile registered through a user authentication setting process;
    detecting an article outgoing command; and
    opening the outdoor-side door when a user authentication corresponds with the user authentication profile,
    wherein, when the article outgoing command is detected, displaying an NFC authentication screen on the display portion to perform an NFC authentication process; and opening the outdoor-side door when the received NFC information matches with the registered NFC information.

11. The method according to claim 10, comprising:
detecting a touch of the display portion;
displaying a setting menu screen on the display portion;
detecting a selection of an authentication setting menu;
displaying a registered profile list on the display portion;
detecting a selection of an authentication target profile;
performing the user authentication setting process;
detecting a completion of the user authentication setting process; and
displaying a user registration completion message.

12. The method according to claim 11, wherein the user authentication profile registered in the user authentication setting process comprises at least one of an NFC of a mobile device and a password.

13. The method according to claim 12, comprising:
performing an authentication procedure of determining whether an NFC information or a password which is received matches with an NFC information or a password registered in the user authentication profile, in a state where the article outgoing command is detected; and
opening the outdoor-side door when the determination of the authentication procedure is that there is a match.

14. The method according to claim 10, comprising:
detecting an attempt to open the outdoor-side door in a state where the article outgoing command is not detected; and
transmitting a warning message to a user's mobile device together with a warning sound.

15. The method according to claim 14, comprising:
operating a camera mounted inside the storage compartment or on the outdoor-side door to capture an inside of the storage compartment or a front side of the outdoor-sidedoor, respectively, when the attempt to open the outdoor-side door is detected in the state where the article outgoing command is not detected; and
transmitting a captured image to the user's mobile device.

16. The method according to claim 10, comprising:
lighting a notification light disposed at the indoor-side door to notify that the article is stored in the storage compartment.

17. The method according to claim 10, comprising:
displaying in a touch button shape, an authentication method selection portion, which allows a user to select any one of an NFC authentication method and a password authentication method on the display portion, in the state where the article outgoing command is detected.

18. The method according to claim 10, wherein, when the received NFC information does not match with the registered NFC information, or the NFC authentication procedure cannot be performed, the method comprising:
displaying a password input screen on the display portion to perform an password authentication process.

* * * * *